US012645543B2

(12) United States Patent
Yamamoto et al.

(10) Patent No.: US 12,645,543 B2
(45) Date of Patent: Jun. 2, 2026

(54) STORAGE SYSTEM AND CONTROL METHOD FOR DATA-TYPE REDUNDANCY AND NON-VOLATILE DATA MANAGEMENT

(71) Applicant: Hitachi Vantara, Ltd., Yokohama (JP)

(72) Inventors: Takahiro Yamamoto, Tokyo (JP); Hiroki Fujii, Tokyo (JP); Yoshinori Ohira, Tokyo (JP)

(73) Assignee: HITACHI VANTARA, LTD., Yokohama (JP)

( * ) Notice: Subject to any disclaimer, the term of this patent is extended or adjusted under 35 U.S.C. 154(b) by 0 days.

(21) Appl. No.: 18/824,997

(22) Filed: Sep. 5, 2024

(65) Prior Publication Data

US 2025/0181456 A1 Jun. 5, 2025

(30) Foreign Application Priority Data

Nov. 30, 2023 (JP) ................................. 2023-203339

(51) Int. Cl.
*G06F 11/14* (2026.01)
*G06F 11/1446* (2026.01)
*G06F 16/18* (2019.01)

(52) U.S. Cl.
CPC ...... *G06F 11/1464* (2013.01); *G06F 11/1451* (2013.01); *G06F 16/1815* (2019.01)

(58) Field of Classification Search
CPC .. G06F 11/14; G06F 11/1464; G06F 16/1815; G06F 11/1451
See application file for complete search history.

(56) References Cited

U.S. PATENT DOCUMENTS

| | | | | |
|---|---|---|---|---|
| 10,496,294 B2 * | 12/2019 | Imazaki | ................ | G06F 3/0619 |
| 2005/0033827 A1 * | 2/2005 | Yamagami | .............. | H04L 67/59 709/219 |
| 2014/0025916 A1 * | 1/2014 | Oshima | ................. | G06F 3/0685 711/E12.002 |
| 2018/0121112 A1 * | 5/2018 | Imazaki | ................ | G06F 3/0619 |
| 2018/0121354 A1 * | 5/2018 | Ishiyama | ................ | G06F 3/068 |
| 2018/0293137 A1 * | 10/2018 | Akutsu | ............... | G06F 11/1469 |
| 2025/0278338 A1 * | 9/2025 | Ebara | .................. | G06F 11/1464 |

FOREIGN PATENT DOCUMENTS

JP          2005-018736 A          1/2005

* cited by examiner

*Primary Examiner* — Kamini B Patel

(74) *Attorney, Agent, or Firm* — MATTINGLY & MALUR, PC

(57) ABSTRACT

In each of a plurality of nodes constituting a storage system, when there is data to be stored in a segment allocated from a cache, the node determines, for the segment, whether redundancy (redundant data of the data in the segment is transferred to another node) and whether non-volatilization (data in the segment is stored in a non-volatile area) are required according to a type of the data, and controls, based on a result of the determination, whether to perform the redundancy of data in the segment and whether to perform the non-volatilization of data in the segment.

13 Claims, 17 Drawing Sheets

SYSTEM CONFIGURATION MANAGEMENT TABLE

810

NODE CONFIGURATION MANAGEMENT TABLE

| NODE ID | STATE | DRIVE ID LIST | PORT ID LIST |
|---------|-------|---------------|--------------|
| 0 | Warning | 0, 1, 2 | 0, 1 |
| 1 | Normal | 3, 4 | 2, 3 |
| 2 | Normal | 5, 6 | 4, 5 |
| ... | ... | ... | ... |

811    812    813    814

820

DRIVE CONFIGURATION MANAGEMENT TABLE

| DRIVE ID | STATE | SIZE |
|----------|-------|------|
| 0 | Normal | 1400 GB |
| 1 | Normal | 1400 GB |
| 2 | Failure | 2000 GB |
| ... | ... | ... |

821    822    823

830

PORT CONFIGURATION MANAGEMENT TABLE

| PORT ID | STATE | Address |
|---------|-------|---------|
| 0 | Normal | 172.12.16.200 |
| 1 | Normal | 172.12.16.201 |
| 2 | Normal | 172.12.16.202 |
| ... | ... | ... |

PAIR CONFIGURATION MANAGEMENT TABLE

910

VOL MANAGEMENT TABLE

| VOL ID | OWNER NODE ID | STANDBY NODE ID | SIZE | ATTRIBUTE |
|--------|---------------|-----------------|------|-----------|
| 0 | 0 | 1 | 500 GB | NML_VOL |
| 1 | 1 | 2 | 1200 GB | PAIR_VOL |
| 2 | 1 | 2 | 2400 GB | JNL_VOL |
| ... | ... | ... | ... | ... |

911     912     913     914     915

920

PAIR MANAGEMENT TABLE

| PAIR GROUP ID | PJVOL ID | PVOL ID | SJVOL ID | SVOL ID | STATE |
|---------------|----------|---------|----------|---------|-------|
| 0 | 2 | 1 | 2 | 1 | PAIR |
| 1 | 3 | 5, 6 | 5 | 7, 8 | COPY |
| 2 | 1 | 7 | 1 | 9 | SUSPEND |
| ... | ... | ... | ... | ... | ... |

921     922     923     924     925     926

930

JNL MANAGEMENT TABLE

| PAIR GROUP ID | JNL ID | P/S VOL ID | P/SVOL ADDRESS | SIZE | CACHE SEGMENT ID |
|---------------|--------|------------|----------------|------|------------------|
| 0 | 0 | 1,1 | ... | 256KB | 8 |
| 1 | 0 | 5,7 | ... | 8KB | 9 |
| 1 | 1 | 6,8 | ... | 32KB | 7 |
| ... | ... | ... | ... | ... | ... |

931     932     933     934     935     936

713

CACHE MANAGEMENT TABLE

1001

DIRTY QUEUE

Drive#
0
1

1002

CLEAN QUEUE

Size
4KB
8KB

1003

FREE QUEUE

Size
4KB
8KB
...
256KB
...

1004

CACHE SEGMENT MANAGEMENT TABLE

| SEGMENT ID | MEMORY ADDRESS | SIZE | VOL ID | VOL ADDRESS | REDUNDANCY-AND-NON-VOLATILE FLAG |
|---|---|---|---|---|---|
| 0 | 0x00201000 | 4KB | 0 | 0x00010001 | REDUNDANCY=1 NON-VOLATILE=1 |
| 1 | 0x00202000 | 8KB | 2 | 0x00000011 | REDUNDANCY=0 NON-VOLATILE=0 |
| ... | ... | ... | ... | ... | ... |

1041      1042      1043      1044      1045      1046

STORAGE SYSTEM AND CONTROL METHOD FOR DATA-TYPE REDUNDANCY AND NON-VOLATILE DATA MANAGEMENT

CROSS-REFERENCE TO RELATED APPLICATION

The present application claims priority from Japanese application JP2023-203339, filed on Nov. 30, 2023, the content of which is hereby incorporated by reference into this application.

BACKGROUND OF THE INVENTION

1. Field of the Invention

The present invention generally relates to storage control.

2. Description of Related Art

As an example of storage control, there is a remote copy. As the remote copy, for example, a technique disclosed in PTL 1 is known.

CITATION LIST

Patent Literature

PTL 1: JP2005-18736A

SUMMARY OF THE INVENTION

Among a primary storage system (a storage system in a primary site) and a secondary storage system (a storage system in a secondary site), a software defined storage (SDS) may be adopted as at least the secondary storage system. The SDS is based on one or a plurality of (typically a plurality of) storage nodes. These storage nodes are in, for example, an on-premises environment or a cloud environment. The storage node (hereinafter, referred to as a node) is, for example, a general-purpose computer, and has a cache and a VOL (logical volume). The cache is typically in volatile memory and the VOL is typically based on a persistent storage.

A node serving as a base of the SDS generally has no battery. Therefore, when power disconnection occurs in a node, data stored in a cache (typically, a volatile memory) of the node may be lost. In order to prevent such data loss, the node performs a data protection process of writing data from the cache to the VOL.

Specifically, for example, in an asynchronous remote copy, data stored in a cache includes a journal (JNL) and data to be copied from a primary VOL (PVOL) to a secondary VOL (SVOL). The JNL includes data to be copied (replica) and metadata of the data.

It is assumed that the secondary storage system includes first and second nodes. It is assumed that the first node includes a first cache, a first JVOL (JNL VOL), a first memory backup area, and a first SVOL. The first JVOL, the first memory backup area, and the first SVOL are areas based on a persistent storage inside or outside the first node. It is assumed that the second node includes a second cache, a second JVOL (JNL), a second memory backup area, and a second SVOL. The second JVOL, the second memory backup area, and the second SVOL are areas based on a persistent storage inside or outside the second node. It is assumed that the second SVOL is a mirror VOL of the first SVOL.

When the first node receives a JNL from the primary storage system, for example, the following process is performed.

The first node writes the received JNL to the first cache, copies the data in the JNL to the first cache, and writes the JNL and the data to the first memory backup area. The first node transfers the JNL and the data stored in the first cache to the second node for data redundancy. The second node writes the JNL and the data to the second cache, and writes the JNL and the data to the second memory backup area. Accordingly, even when the JNL and the data are lost from the first cache due to the power disconnection of the first node, the possibility that the JNL and the data can be recovered increases.

The first node writes a log to the first JVOL, and then writes the JNL to the first JVOL. The first node writes the log to the first SVOL, and then writes the data in the JNL to the first SVOL. Similarly, the second node writes a log to the second JVOL, and then writes the JNL to the second JVOL. The second node writes the log to the second SVOL, and then writes the data in the JNL to the second SVOL. Accordingly, the data is made redundant in the first SVOL and the second SVOL, and even when a failure occurs in one of the first and second nodes, the data can be recovered from the other node.

However, in this process, a frequency of writing from the cache to the VOL is high in the asynchronous remote copy, and therefore, there is a concern that performance of the asynchronous remote copy may deteriorate.

The fact that the frequency of writing from the cache to a non-volatile medium (for example, a non-volatile medium serving as a basis of the VOL) is high relates to a storage system including a plurality of nodes (a storage system in which redundancy of data is implemented between nodes), and may exist as a problem for storage control other than the asynchronous remote copy.

In each of a plurality of nodes constituting a storage system, when there is data to be stored in a segment allocated from a cache, the node determines, for the segment, whether redundancy (redundant data of the data in the segment is transferred to another node) and whether non-volatilization (data in the segment is stored in a non-volatile area) are required according to a type of the data, and controls, based on a result of the determination, whether to perform the redundancy of data in the segment and whether to perform the non-volatilization of data in the segment.

According to the invention, it is possible to appropriately reduce a frequency of writing from a cache to a non-volatile medium in a storage system including a plurality of nodes.

BRIEF DESCRIPTION OF THE DRAWINGS

FIG. 8 is a diagram showing an example of a system configuration management table;

FIG. 9 is a diagram showing an example of a pair configuration management table;

DESCRIPTION OF EMBODIMENTS

Figure 1:
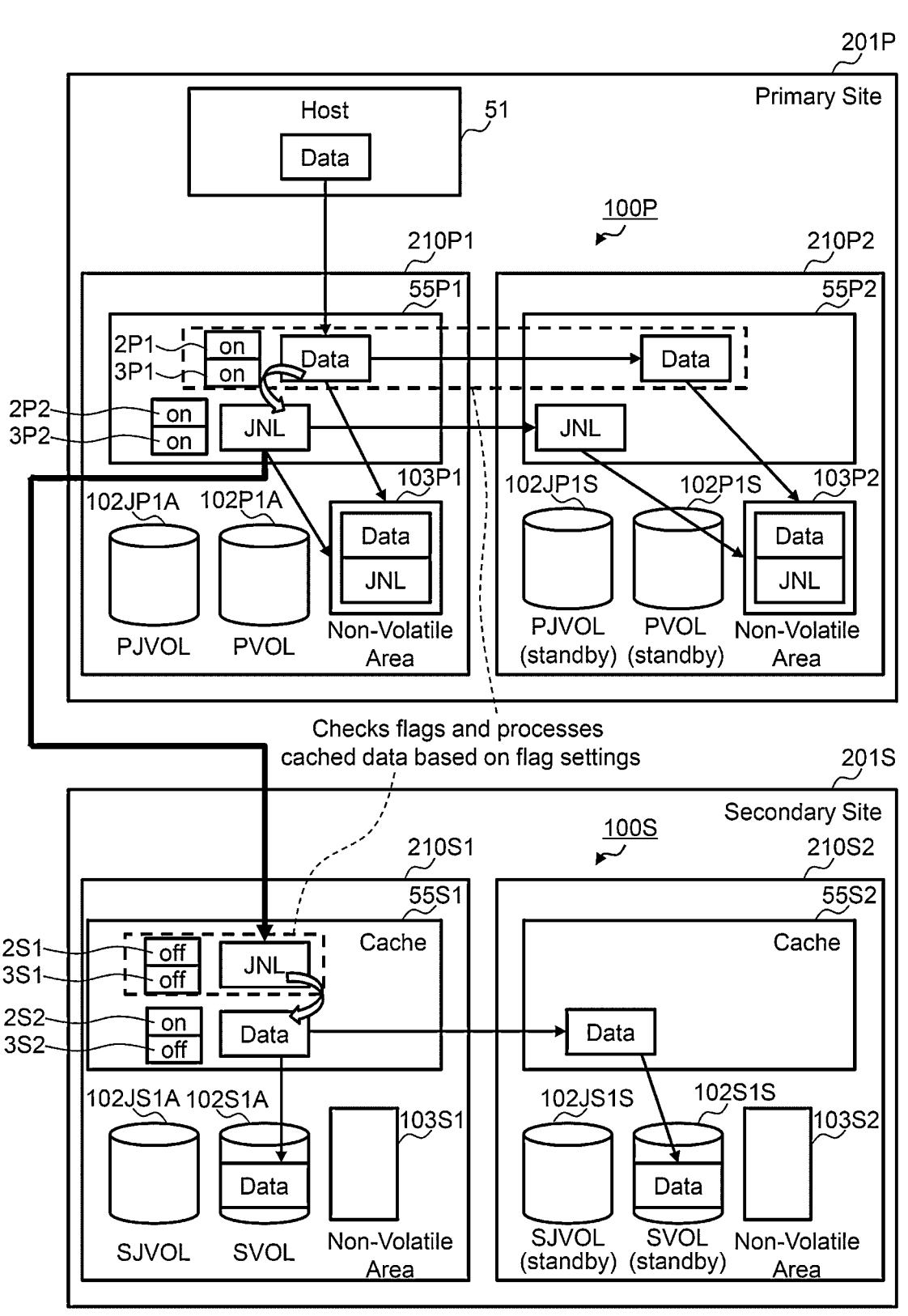
FIG. 1 is a schematic diagram showing an outline of one embodiment according to the invention.

In the following description, an "interface device" may be one or more communication interface devices. The one or more communication interface devices may be one or more communication interface devices of the same type (for example, one or more network interface cards (NICs)) or two or more communication interface devices of different types (for example, NIC and host bus adapter (HBA)).

In the following description, a "memory" is one or more memory devices, which are examples of one or more storage devices, and may be typically a main storage device. At least one memory device in the memory may be a volatile memory device or a non-volatile memory device.

In the following description, a "persistent storage" may be one or more persistent storages, which are examples of one or more storage devices. The persistent storage may be typically a non-volatile storage device (for example, an auxiliary storage device), and specifically, for example, a hard disk drive (HDD), a solid state drive (SSD), or a non-volatile memory express (NVMe) drive.

In the following description, a "processor" may be one or more processor devices. At least one processor device may be typically a microprocessor device such as a central processing unit (CPU), and may be another type of processor device such as a graphics processing unit (GPU). At least one processor device may be a single core or a multi-core. At least one processor device may be a processor core. At least one processor device may be a broadly defined processor device such as a hardware circuit (for example, a field-programmable gate array (FPGA), a complex programmable logic device (CPLD), or an application specific integrated circuit (ASIC)) that performs a part or all the process.

In the following description, information that can be output in response to an input may be described by an expression such as "xxx table", whereas the information may be data of any structure (for example, may be structured data or unstructured data), and may be a learning model such as a neural network, a genetic algorithm, or a random forest that generates an output in response to an input. Therefore, the "xxx table" can be referred to as "xxx information". In the following description, a configuration of each table is an example. One table may be divided into two or more tables, or all or some of two or more tables may be one table.

In the following description, a process may be described using a "program" as a subject, but since a program is executed by a processor to perform a predetermined process using a storage device and/or an interface device as appropriate, the subject of the process may be a processor (or a device such as a controller including the processor). The program may be installed on a device such as a computer from a program source. The program source may be, for example, a program distribution server or a computer-readable (for example, non-transitory) recording medium. In addition, in the following description, two or more programs may be implemented as one program, or one program may be implemented as two or more programs.

In addition, in the following description, when elements of the same type are described without being distinguished, a common part of the reference numerals may be used, and when elements of the same type are distinguished and described, the reference numerals or identifiers of the elements may be used. For example, for PVOL, a reference symbol such as "PVOL 102P1" may be used, or an identifier such as "PVOL 1" may be used.

FIG. 1 is a schematic diagram showing an outline of one embodiment according to the invention.

A primary site 201P includes a host 51 and a primary storage system 100P. The host 51 may be a physical computer or a logical computer (for example, a virtual machine). The primary storage system 100P may be a so-called disk array system, and in the embodiment, is a system including a plurality of primary nodes 210P.

There is a secondary storage system 100S in a secondary site 201S. The secondary storage system 100S is a system including a plurality of secondary nodes 210S.

A node 210 is typically a general-purpose computer, and may be a device other than the general-purpose computer. The node 210 typically does not have a battery. The node 210 includes a cache 55, a VOL (logical volume) 102, and a non-volatile area 103. The cache 55 is typically a volatile memory. The VOL 102 and the non-volatile area 103 are based on a persistent storage inside or outside the node 210.

The plurality of primary nodes 210P include, for example, a first primary node 210P1 and a second primary node 210P2. The VOL 102 includes PJVOL 102JP and PVOL 102P. The "PJVOL" is a JVOL located on the primary site 201P. The "JVOL" is a VOL in which a JNL (journal) is stored. The "JNL" includes data to be copied and metadata thereof. The metadata in the JNL includes a sequence number (SEQ #) which is a value for identifying an order in which the data to be copied is written, and a write destination address of the data. The "PVOL" is a primary VOL.

The plurality of secondary nodes 210S include, for example, a first secondary node 210S1 and a second secondary node 210S2. The VOL 102 includes SJVOL 102JS and SVOL 102S. The "SJVOL" is a JVOL located on the secondary site 201S. The "SVOL" is a secondary VOL forming a pair with the PVOL.

In the present embodiment, in each of the primary storage system 100P and the secondary storage system 100S, a redundancy flag 2 and a non-volatile flag 3 are provided for each segment in the cache 55 (an example of a cache area).

The redundancy flag 2 indicates whether redundancy is required. When the value of the redundancy flag 2 is "on", data in the segment in the cache 55 is made redundant (copied to another node). When the value of the redundancy flag 2 is "off", the data in the segment in the cache 55 is not made redundant.

The non-volatile flag 3 indicates whether non-volatilization is required. When the value of the non-volatile flag 3 is "on", data in the segment in the cache 55 is made non-volatile (written into the non-volatile area 103). When the value of the non-volatile flag 3 is "off", the data in the segment in the cache 55 is not made non-volatile.

The values of the redundancy flag 2 and the non-volatile flag 3 corresponding to the segment are controlled according to a type of data in the segment.

For example, in the present embodiment, the following process is performed. In FIG. 1, PJVOL 102JP1S in the second primary node 210P2 is a standby VOL (mirror VOL) for PJVOL 102JP1A in the first primary node 210P1. PVOL 102P1S in the second primary node 210P2 is a standby VOL for PVOL 102P1A in the first primary node 210P1. SJVOL 102JS1S in the second secondary node 210S2 is a standby VOL for SJVOL 102JS1A in the first secondary node 210S1. SVOL 102S1S in the second secondary node 210S2 is a standby VOL for SVOL 102S1A in the first secondary node 210S1.

The first primary node 210P1 receives a write request identifying the PVOL 102P1A, and writes write target data associated with the write request to a first segment of a cache 55P1. The first primary node 210P1 sets values of a redundancy flag 2P1 and a non-volatile flag 3P1 of the first segment to "on". Therefore, the first primary node 210P1 transfers the data in the first segment to the second primary node 210P2 (redundancy), and writes the data into a non-volatile area 103P1 (non-volatilization). The second primary node 210P2 receives the data, writes it into a segment of a cache 55P2, and writes it into a non-volatile area 103P2. Although not shown, for the segment of the cache 55P2 (the segment into which data from the first primary node 210P1 is written), the redundancy flag may be set to "off" and the non-volatile flag may be set to "on". Accordingly, redundancy of the data is skipped, and the data is made non-volatile (data is written into the non-volatile area 103P2).

The first primary node 210P1 generates a JNL including data in the first segment of the cache 55P1 and writes the JNL into a second segment of the cache 55P1. The first primary node 210P1 sets values of a redundancy flag 2P2 and a non-volatile flag 3P2 of the second segment to "on". Therefore, the first primary node 210P1 transfers the JNL in the second segment to the second primary node 210P2 (redundancy), and writes it into the non-volatile area 103P1 (non-volatilization). The second primary node 210P2 receives the JNL, writes it into the segment of the cache 55P2, and writes it into the non-volatile area 103P2. Although not shown, as well as for the segment of the cache 55P2 (the segment into which JNL from the first primary node 210P1 is written), the redundancy flag may be set to "off" and the non-volatile flag may be set to "on". Accordingly, the redundancy of the JNL is skipped, and the JNL is made non-volatile.

Although not shown, the first primary node 210P1 writes the data into the cache 55P1 to the PVOL 102P1A, and writes the JNL into the cache 55P1 to the PJVOL 102JP1A. Similarly, the second primary node 210P2 writes the data into the cache 55P2 to the PVOL 102P1S, and writes the JNL into the cache 55P2 to the PJVOL 102JP1S.

The first secondary node 210S1 receives the JNL from the first primary node 210P1. In the present embodiment, the JNL is received in response to a JNL read request (for example, a read request identifying a SEQ # of a JNL to be read) from the first secondary node 210S1 to the first primary node 210P1, and the JNL may also be received in response to a JNL write request (for example, a write request associated with a JNL to be written) from the first primary node 210P1 to the first secondary node 210S1.

The first secondary node 210S1 writes the received JNL into a first segment of a cache 55S1. The first secondary node 210S1 sets values of a redundancy flag 2S1 and a non-volatile flag 3S1 of the first segment to "off". Therefore, both redundancy and non-volatilization of the JNL are skipped.

The first secondary node 210S1 writes the data into the JNL in the first segment of the cache 55S1 (the data to be copied) to a second segment of the cache 55S1. The first secondary node 210S1 sets a value of a redundancy flag 2S2 of the second segment to "on" and a value of a non-volatile flag 3S2 to "off". Therefore, the redundancy of the data is implemented, but the non-volatilization is skipped. That is, the first secondary node 210S1 writes the data into the second segment of cache 55S1 to the SVOL 102S1A and transfers the data to the second secondary node 210S2. The second secondary node 210S2 receives the data, writes it into a segment of a cache 55P2, and writes it into SVOL 102S1S. Although not shown, for the segment of the cache 55S2 (the segment into which the data from the first secondary node 210S1 (the data in the JNL) is written), both the redundancy flag and the non-volatile flag may be set to "off". Accordingly, both the redundancy and the non-volatilization of the data in the JNL are skipped.

According to the above process, the redundancy and the non-volatilization of the JNL in the first segment of the cache 5551 are skipped, and the non-volatilization of the data in the second segment of the cache 5551 is skipped. Even if the redundancy or the non-volatilization is skipped, when the JNL or the data is lost from the cache 5551 due to power disconnection or the like of the first secondary node 21051, the JNL or the data can be recovered from primary site 201P.

Specifically, the JNL including the data is stored in the PJVOL 102JP1A (and 102JP1S) until the data is written into the first and second SVOLs 102S1A (and 102S1S). That is, when the data is written into the SVOL 102S1A (and 102S1S), the first secondary node 210S1 notifies the first primary node 210P1 of the SEQ # of the JNL that includes the data that is copied to the SVOL 102S1A (and 102S1S). When the first primary node 210P1 receives the notification of the SEQ # of a JNL whose data is copied (reflected to the SVOL 102S), the first primary node purges the JNL having that SEQ # from the JVOL 102JP1A (the second primary node 210P2 also purges the JNL having that SEQ # from the JVOL 102JP1S). In this way, until the data is written into the SVOL 102S1A (and 102S1S), the JNL including the data is stored in the primary site 201P. The first secondary node 210S1 sends the JNL read request identifying the SEQ # of the JNL to be recovered to the first primary node 210P1 in order to recover the JNL or the data that is lost from the cache 5551 before being written into the SJVOL 102JS1A or the SVOL 102S1A. Accordingly, the first secondary node 210S1 can acquire the JNL having the SEQ # from the first primary node 210P1, and can acquire the data in the JNL.

Hereinafter, the embodiment will be described in detail.

Figure 2:
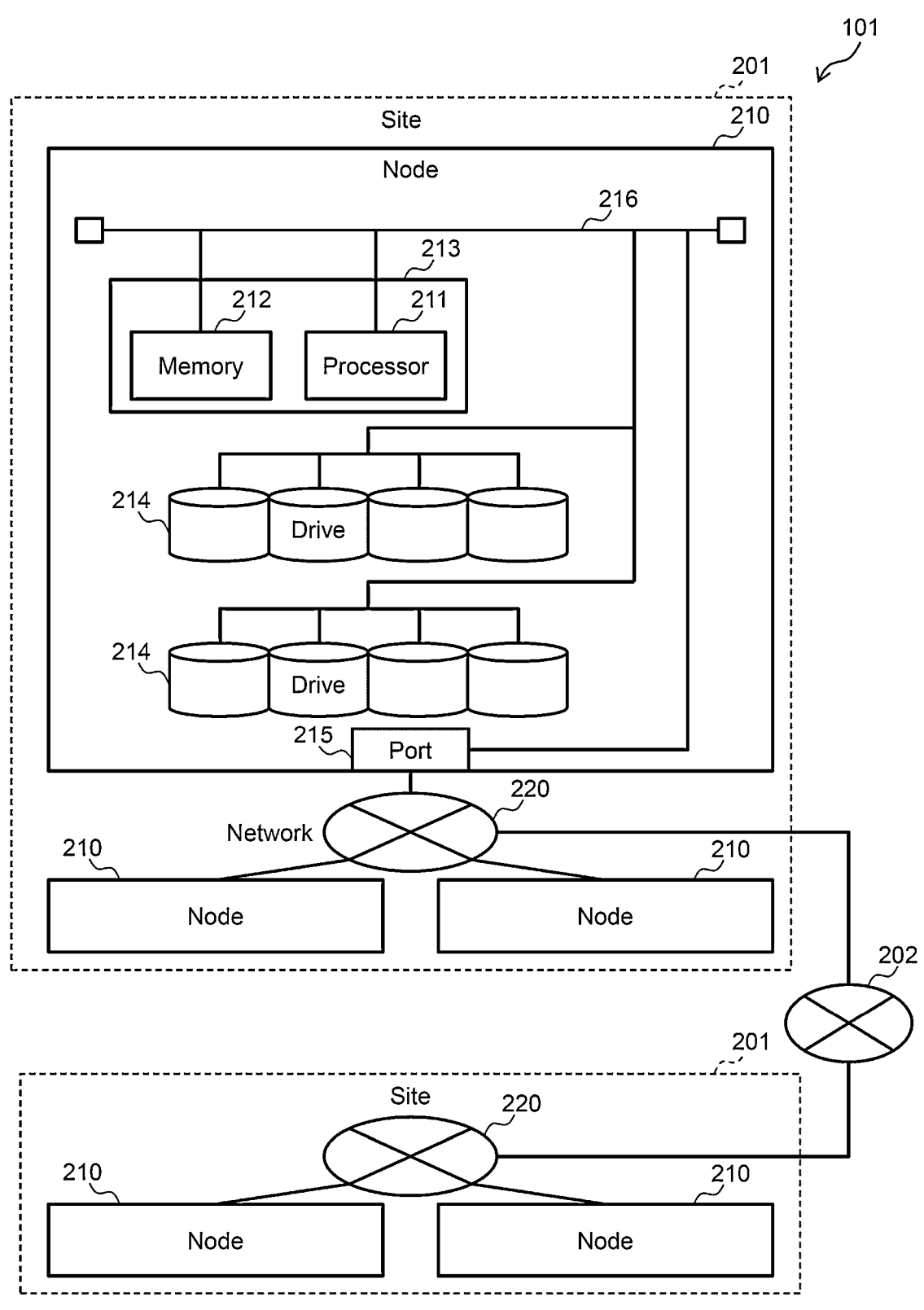
FIG. 2 is a diagram showing a physical configuration example of an entire system.

FIG. 2 is a diagram showing a physical configuration example of a storage system 101.

There are a plurality of sites 201. The sites 201 are communicably connected via a network 202. The network 202 is, for example, a wide area network (WAN), and is not limited to the WAN. The site 201 is a data center or the like, and includes a plurality of (or one) nodes 210.

The node 210 may be a general-purpose computer. The node 210 includes, for example, one or more processor packages 213 including a processor 211 and a memory 212, one or more drives 214, and one or more ports 215. These components are connected via an internal bus 216. The drive 214 is an example of a persistent storage device.

The processor 211 is, for example, a central processing unit (CPU) and performs various processes.

The memory 212 is typically a volatile memory, and stores control information or data necessary for implementing functions of the node 210. The memory 212 stores, for example, a program executed by the processor 211. The drive 214 stores various kinds of data and programs.

The port 215 is connected to a network 220 in the site 201, and connects a present node to another node 210 in the site 201 via the network 220 so that the present node can communicate with another node 210. The network 220 is, for example, a local area network (LAN), and is not limited to the LAN.

The physical configuration of the system is not limited to the above-described configuration. For example, the networks 202 and/or 220 may be made redundant. For example, the network 220 may be separated into a management network and a storage network, a connection standard may be Ethernet (registered trademark), Infiniband, or wireless, and a connection topology is not limited to the configuration shown in FIG. 2. For example, the drive 214 may be independent of the node 210.

Figure 3:
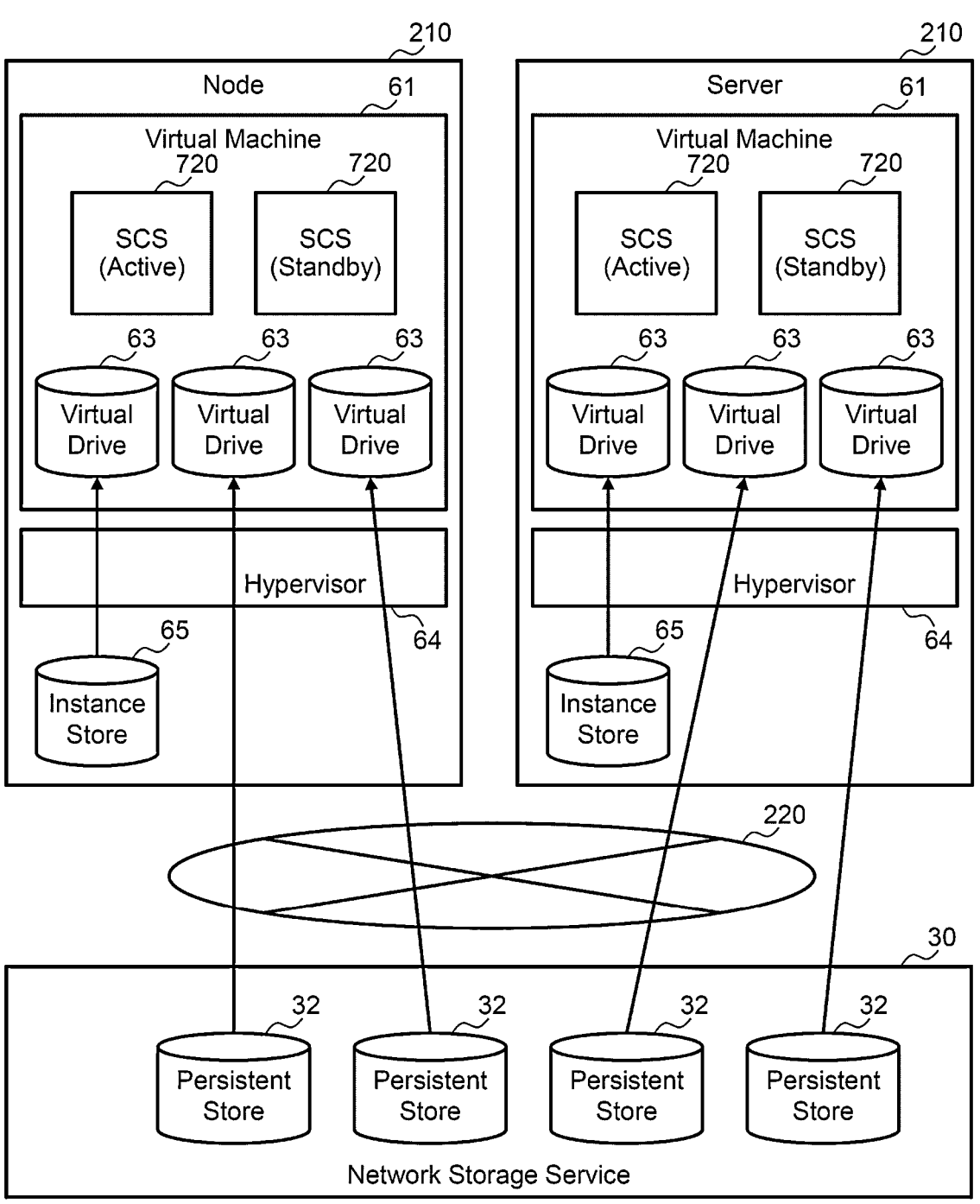
FIG. 3 is a diagram showing a configuration example of a software platform of a site.

FIG. 3 is a diagram showing a configuration example of a software platform of the site 201.

For example, a software platform having the configuration shown in FIG. 3 can be adopted as the secondary site 201S. The site 201 includes a network storage service 30 that provides a plurality of persistent stores 32 to the plurality of nodes 210 via the network 220. The persistent store 32 is a storage area based on the one or more drives 214.

The node 210 includes an instance store 65, a hypervisor 64, and a virtual machine 61.

The instance store 65 provides a temporary storage at a block level for instance. This storage may be on the drive 214 physically touched by the node 210.

The hypervisor 64 dynamically generates or deletes the virtual machine 61.

The virtual machine 61 manages one or more virtual drives 63 and executes storage control software (SCS) 720.

The SCS 720 controls input/output (I/O) for the virtual drive 63. The storage control program 720 is made redundant between the nodes 210. That is, when a failure occurs in the node 210, instead of the SCS (Active) 720 of the node 210, the SCS (Standby) 720 of another node 210 is changed from Standby to Active.

The virtual drive 63 is a storage area to which the instance store 65 or the persistent store 32 is assigned. The virtual drive 63 may be treated as the VOL 102.

As described above, in the site 201, the instance store 65 based on a direct attached storage (DAS) and a storage (network storage service 30) via the network 220 such as iSCSI are used. The hypervisor 64 may not be required, and for example, the DAS and the network storage service 30 may be implemented by bare metal.

Figure 4:
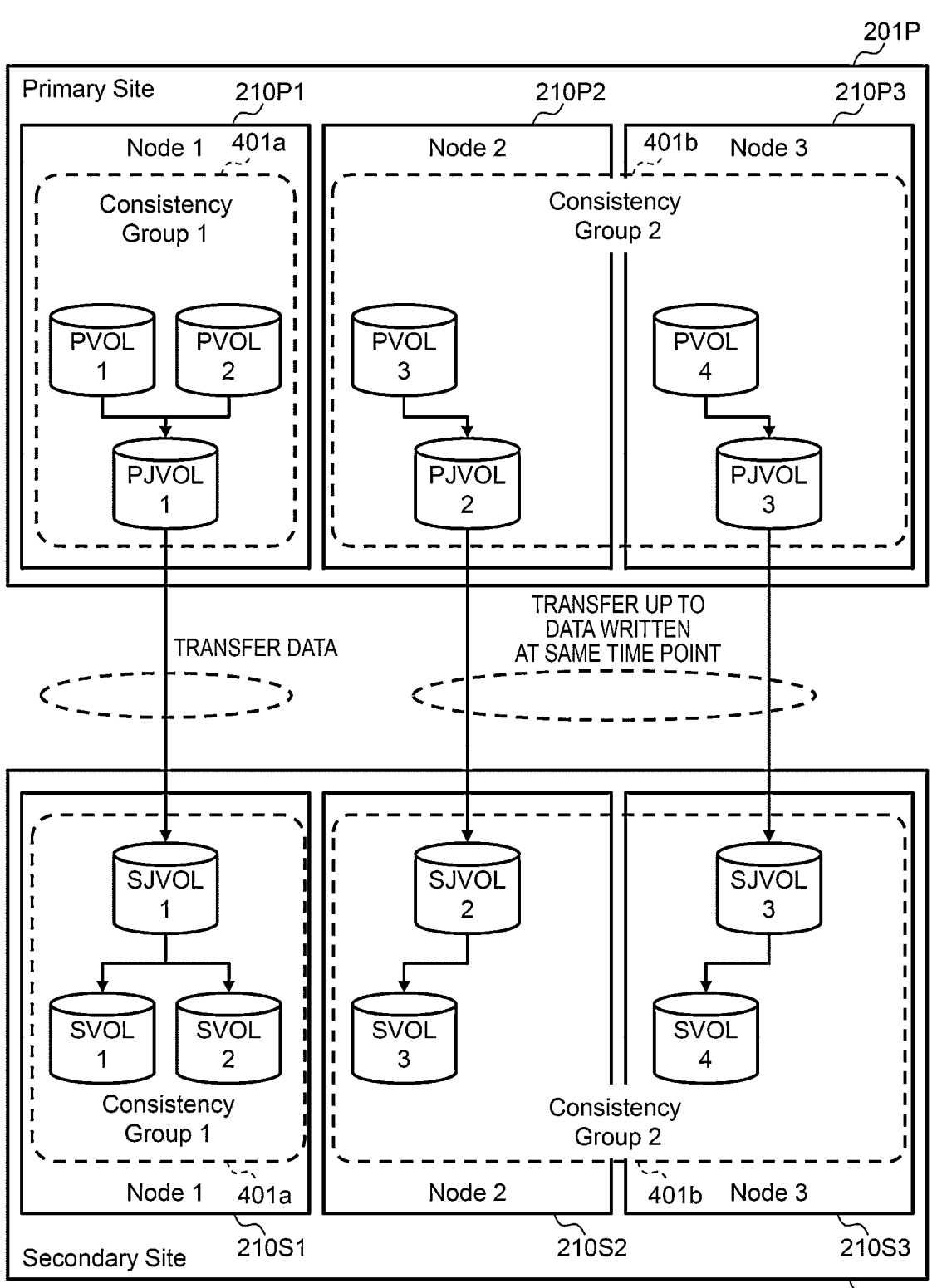
FIG. 4 is a schematic diagram showing an outline of a remote copy configuration.

FIG. 4 is a schematic diagram showing an outline of a remote copy configuration.

A plurality of remote copy pairs are constructed between a plurality of VOLs 102 between the primary site 201P and the secondary site 201S. Specifically, for example, two consistency groups 401a and 401b are constructed between the primary site 201P and the secondary site 201S. A consistency group 401 is made up of the VOLs 102 of a plurality of (or one) remote copy pairs, and in the consistency group 401, a plurality of PVOLs are copied to SVOLs while maintaining consistency. More specifically, for example, in the consistency group 401, update differential data for the plurality of PVOLs 102 up to the same time point is copied to the plurality of SVOLs. Control (consistency control) of the consistency group 401 is managed by the PJVOL. The update differential data for the plurality of (or one) PVOLs 102P is stored in the PJVOL together with the metadata such as a write time point. When transferring PVOL data to the secondary site 201S, the primary site 201P transfers, to the secondary site 201S, the update differential data up to the same time point among the update differential data written into the PJVOL. Accordingly, it is possible to copy data to the SVOL while maintaining consistency in update time points between the plurality of PVOLs.

For example, according to the consistency group 401a, data is copied to the SVOL 1 and the SVOL 2 in the secondary node 210S1 via the PJVOL 1 and the SJVOL 1 while maintaining the consistency of the PVOL 1 and the PVOL 2 in the primary node 210P1. According to the consistency group 401b, data is copied to an SVOL 3 in the secondary node 210S2 and an SVOL 4 in a secondary node 210S3 via a PJVOL 2 in the primary node 210P2, a PJVOL 3 in the primary node 210P3, an SJVOL 2 in the secondary node 210S2, and an SJVOL 3 in the secondary node 210S3, while maintaining the consistency of a PVOL 3 in the primary node 210P2 and a PVOL 4 in the primary node 210P3. The PJVOL and the SJVOL do not necessarily have a 1:1 correspondence (for example, 1:many, many:1, or many:many), and the PJVOL may be an area on the memory 212.

As can be understood from the specific configuration described above, the consistency group 401 may be made up of the VOLs 102 in the specific node 210 in the site 201, or may be made up of the VOLs 102 in the plurality of nodes 210 in the site 201.

Figure 5:
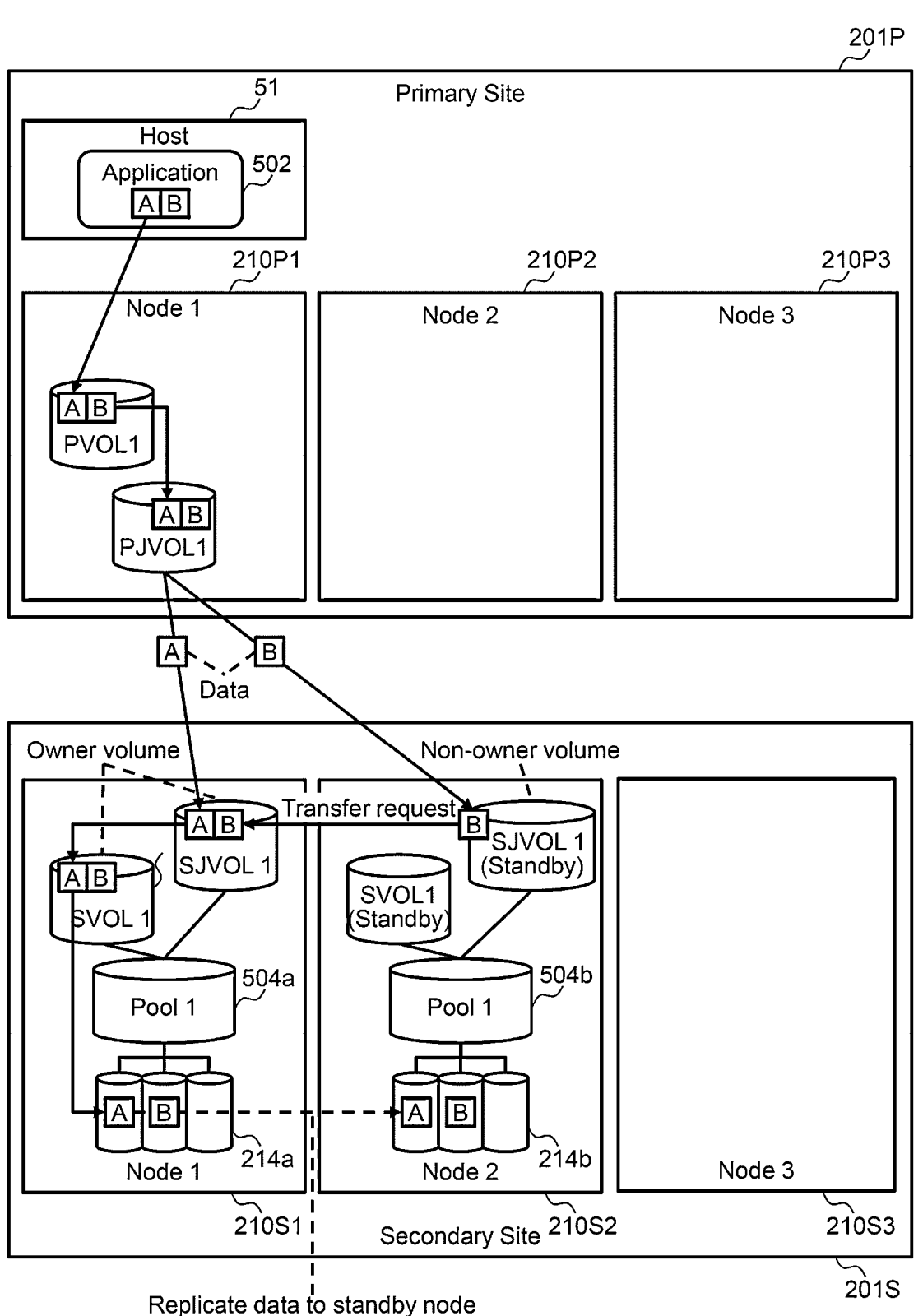
FIG. 5 is a schematic diagram showing an outline of an I/O request process.

FIG. 5 is a schematic diagram showing an outline of the I/O request process.

First, an application 502 running on a host 51 issues a write request designating the PVOL 1 to the primary node 210P1. The primary node 210P1 that receives the write request writes data A and B associated with the write request to the PVOL 1, and further writes a JNL including the data A and B as the update differential data to the PJVOL 1.

Next, the primary node 210P1 transfers the JNL (the update differential data) written into the PJVOL 1 to the SJVOL 1 and the SJVOL 1 (standby) of the secondary site 201S. At this time, when a plurality of communication paths are established between the primary site 201P and the secondary site 201S, the JNL may be transferred using any communication path. Normally, the primary node 210P1 transfers the JNL to the secondary node 210S1 that has ownership of the SVOL 1 paired with the PVOL 1. However, when a failure occurs in the communication path for which the node has the ownership, the primary node 210P1 may transfer the JNL to the secondary node 210S2 or the like that does not have the ownership. For example, when the primary node 210P1 transfers the JNL to the secondary node 210S2 that does not have the ownership, the secondary node 210S2 transfers the received JNL to the secondary node 210S1 that has the ownership, and the secondary node 210S1 writes the JNL to the SJVOL 1.

Next, the secondary node 210S1 writes the JNL written into the SJVOL 1 to the SVOL 1. The data A and B written into the SVOL 1 are written into a drive 214a via a storage pool 504a. When a configuration of the drive 214a is the direct attached storage (DAS) in which the node 210 and the drive 214 are connected to each other on a one-to-one basis, the JNL is written into the drive 214a mounted in the secondary node 210S1. By writing all the data to be copied into the SVOL 1 to the drive 214a of the secondary node 210S1 having the ownership of the SVOL 1 in this way, it is not necessary to read data from another node when reading data from the SVOL 1 later. Accordingly, it is possible to eliminate an inter-node transfer process and implement a high-speed read process.

The storage pool 504 may be an area based on one or more drives 214. Storage functions such as thin-provisioning, compression, or deduplication are provided, and a necessary storage function process is performed on data written into the storage pool 504.

The secondary node 210S1 also writes redundant data of data to be written into a drive 214b of the secondary node 210S2 in order to protect the data from a node failure when writing the data into the drive 214a. In writing the redundant data, when a data protection policy is replication, a replica of data is written into the drive 214b as the redundant data. On the other hand, when the data protection policy is erasure coding, parity is calculated from the data, and the calculated parity is written into the drive 214b as the redundant data.

Figure 6:
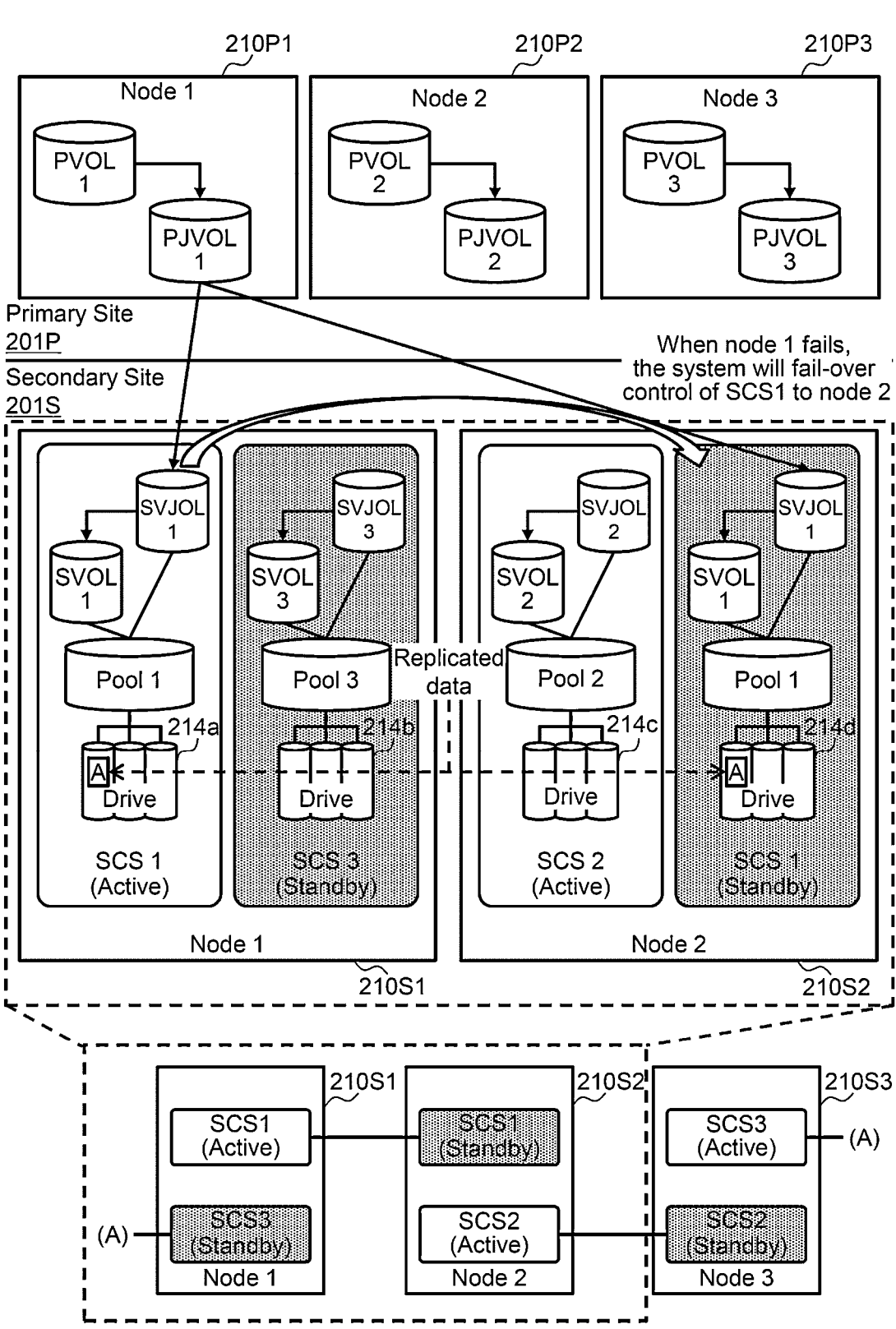
FIG. 6 is a schematic diagram showing an outline of a recovery process from a node failure.

FIG. 6 is a schematic diagram showing an outline of a recovery process from a node failure.

The SCSs 720 are operating in the secondary nodes 210S1, 210S2, and 210S3. The secondary node 210S has an active SCS (Active) and a standby SCS (Standby) corresponding to an SCS (Active) in another secondary node 210S. For example, the secondary node 210S1 has SCS 1 (Active) and SCS 3 (Standby), the secondary node 210S2 has SCS 2 (Active) and SCS 1 (Standby), and the secondary node 210S3 has SCS 3 (Active) and SCS 2 (Standby). SCSx (Active) and SCSx (Standby) belong to a redundant group of SCSx, and the number of SCSx (Standby) is not limited to one, and may be plural (x is a natural number).

The recovery process from the node failure will be described using the specific example shown in FIG. 6.

The secondary node 210S2 replicates configuration information of the SVOL 1 and the SJVOL 1 provided in the secondary node 210S1 in order to take over remote copy pair information of the secondary node 210S1. The secondary node 210S2 stores redundant data of the data written into the drive 214a of the secondary node 210S1 in a drive 214d. Further, the secondary node 210S2 establishes a communication path with the primary node 210P1.

For example, when the secondary node 210S1 stops due to a failure, the secondary node 210S2 that detects the failure of the secondary node 210S1 takes over the process of the SCS 1 (Active) of the secondary node 210S1, and the SCS 1 (Standby) changes to the SCS 1 (Active). The secondary node 210S2 communicates with the primary node 210P1 and continues a remote copy process between the PVOL 1 and the SVOL 1. That is, a fail-over is performed from the SCS 1 of the secondary node 210S1 to the SCS 1 of the secondary node 210S2. Accordingly, even when the node failure occurs in any one of the secondary sites 201S, another secondary site 201S can continue the remote copy from the primary site 201P.

Figure 7:
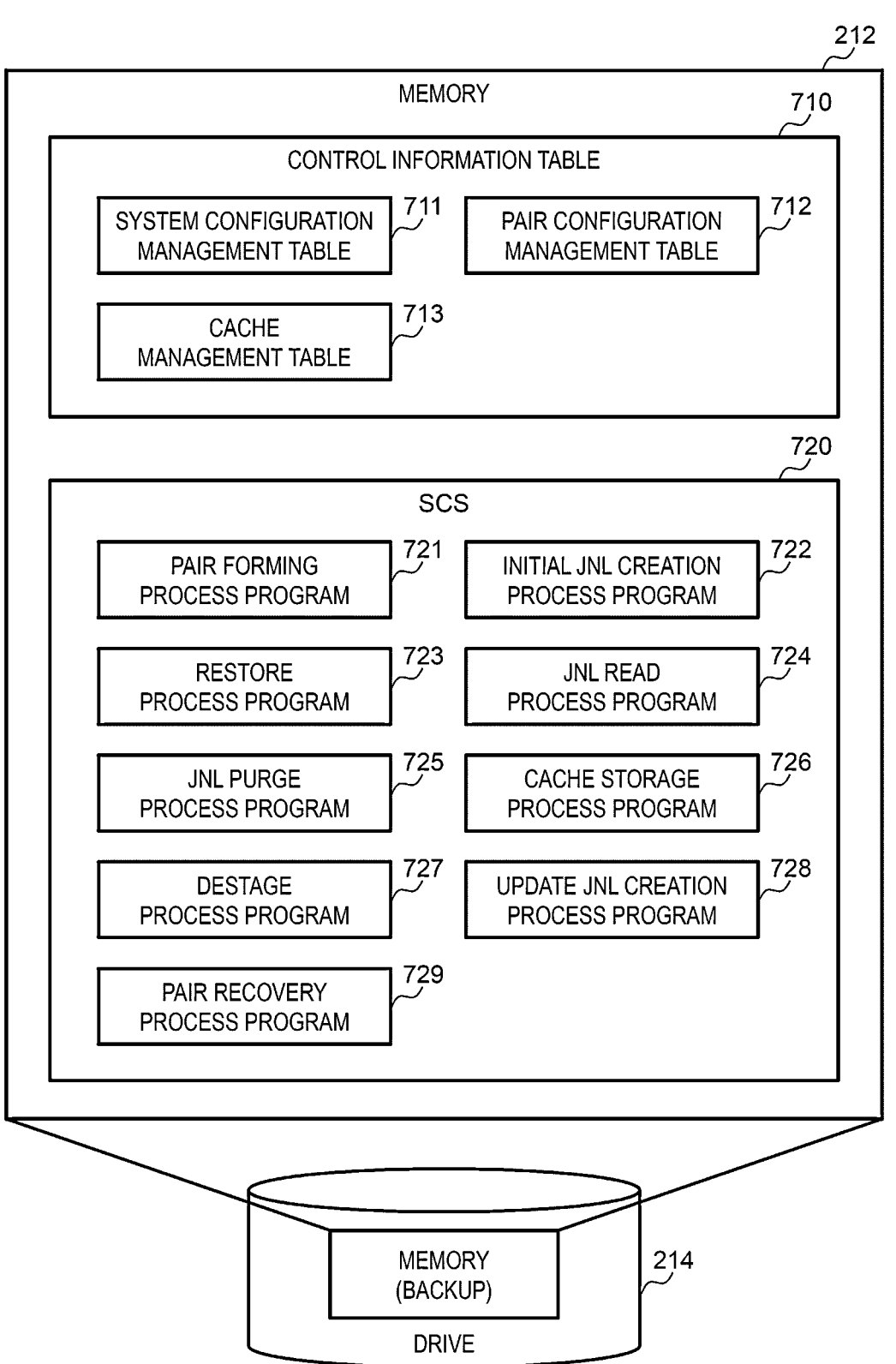
FIG. 7 is a diagram showing an example of data and programs stored in a memory.

FIG. 7 is a diagram showing an example of data and programs stored in the memory 212.

Information is read from the drive 214 to the memory 212. For example, various tables included in a control information table 710 and various programs included in the SCS 720 are loaded on the memory 212 while the process in which the tables and the programs are used is being executed, whereas at other times, the tables and the programs are stored in a non-volatile storage area such as the drive 214 in preparation for a power failure or the like.

The control information table 710 includes a system configuration management table 711, a pair configuration management table 712, and a cache management table 713.

The SCS 720 includes a pair forming process program 721, an initial JNL creation process program 722, a restore process program 723, a JNL read process program 724, a JNL purge process program 725, a cache storage process program 726, a destage process program 727, an update JNL creation process program 728, and a pair recovery process program 729.

FIG. 8 is a diagram showing an example of the system configuration management table 711.

The system configuration management table 711 includes a node configuration management table 810, a drive configuration management table 820, and a port configuration management table 830. For each site 201, there is the node configuration management table 810 related to a plurality of nodes 210 present in each site 201, and the node 210 has the drive configuration management table 820 and the port configuration management table 830 related to the drives 214 within the present node 210.

The node configuration management table 810 is provided for each site 201 and stores information indicating the configuration of the nodes 210 provided at the site 201 (such as a relationship between the nodes 210 and the drives 214). More specifically, the node configuration management table 810 stores, for each node 210, information such as a node ID 811, a state 812, a drive ID list 813, and a port ID list 814.

The node ID 811 is an ID of the node 210. The state 812 indicates a state of the node 210 (for example, "Normal", "Warning", or "Failure"). The drive ID list 813 is a list of IDs of the drives 214 provided in the node 210. The port ID list 814 is a list of IDs of the ports 215 provided in the node 210.

The drive configuration management table 820 is provided for each node 210, and stores information indicating the configuration related to the drives 214 provided in the node 210. More specifically, the drive configuration management table 820 stores, for each drive 214, information such as a drive ID 821, a state 822, and a size 823.

The drive ID 821 is an ID of the drive 214. The state 822 indicates a state of the drive 214. The size 823 indicates a capacity of the drive 214.

The port configuration management table 830 is provided for each node 210, and stores information indicating the configuration related to the ports 215 provided in the node 210. More specifically, the port configuration management table 830 stores, for each port, information such as a port ID 831, a state 832, and an Address 833.

The port ID 831 is an ID of the port 215. The state 832 indicates a state of the port 215. The Address 833 indicates an address on the network assigned to the port 215. A form of the address may be an Internet protocol (IP), a world wide name (WWN), a media access control (MAC) address, or the like.

FIG. 9 is a diagram showing an example of the pair configuration management table 712.

The pair configuration management table 712 includes a VOL management table 910, a pair management table 920, and a JNL management table 930.

The VOL management table 910 stores information indicating the configuration related to the VOL 102. More specifically, the VOL management table 910 stores, for each VOL 102, information such as a VOL ID 911, an owner node ID 912, a standby node ID 913, a size 914, and an attribute 915.

The VOL ID 911 is an ID of the VOL 102. The owner node ID 912 is the ID of the node 210 having the ownership of the VOL 102. The standby node ID 913 is the ID of the node 210 that takes over the process when the node 210 having the ownership of the SVOL fails. The size 914 indicates a capacity of the VOL 102.

The attribute 915 indicates an attribute of the VOL 102. "NML_VOL" means a normal VOL that does not belong to a consistency group. "PAIR_VOL" means a PVOL or an SVOL that belongs to a consistency group. "JNL_VOL" means JVOL.

The pair management table 920 stores information indicating the configuration related to the remote copy pair. More specifically, the pair management table 920 stores, for each consistency group, information such as a pair group ID 921, a PJVOL ID 922, a PVOL ID 923, an SJVOL ID 924, an SVOL ID 925, and a state 926.

The pair group ID 921 is an ID of the consistency group. The PJVOL ID 922 is a list of IDs of PJVOL 102JP belonging to the consistency group. The PVOL ID 923 is a list of IDs of PVOL 102P belonging to the consistency group. The SJVOL ID 924 is a list of IDs of an SJVOL 102JS belonging to the consistency group. The SVOL ID 925 is a list of IDs of an SVOL 102S belonging to the consistency group. The state 926 indicates a state of each remote copy pair in the consistency group (for example, "PAIR", "COPY", or "SUSPEND"). The "PAIR" is a state in which writing into the PVOL 102P is periodically reflected in the SVOL 102S. The "COPY" is a state in which initial copy is in progress. The "SUSPEND" is a pair suspension state (a state in which synchronization between the PVOL 102P and the SVOL 102S is not performed).

The JNL management table 930 stores information related to the JNL. More specifically, the JNL management table 930 stores, for each JNL, information such as a pair group ID 931, a JNL ID 932, a P/SVOL ID 933, a P/SVOL address 934, a size 935, and a cache segment ID 936.

The pair group ID 931 is an ID of the consistency group to which the JNL belongs. The JNL ID 932 is an ID of the JNL. The ID of the JNL corresponds to SEQ #, and is, for example, a serial number in the consistency group. That is, the ID of the JNL indicates a write order, and data in the JNL is stored in the SVOL 102S in the consistency group in accordance with the order of the ID of the JNL.

The P/SVOL ID 933 includes an ID of the PVOL 102P to which the data in the JNL is written and an ID of the SVOL 102S to which the data in the JNL is written. The P/SVOL address 934 includes a storage destination address of the data in the PVOL 102P to which the data in the JNL is written and a storage destination address of the data in the SVOL 102S to which the data in the JNL is written.

The size 935 indicates a size of the JNL. For example, one JNL includes one or a plurality of pieces of data. The cache segment ID 936 is an ID of a cache segment to which data in the JNL is written.

Figure 10:
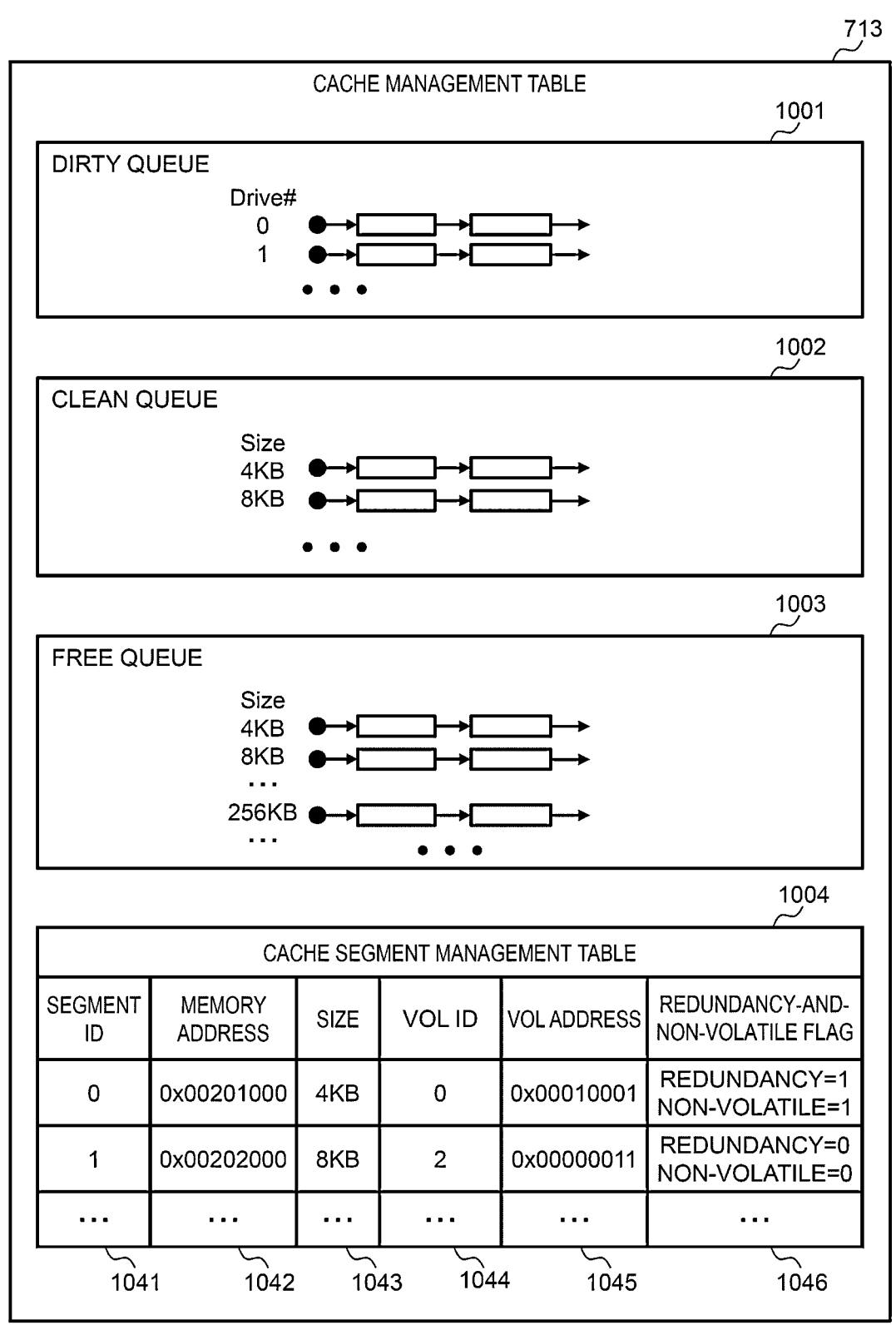
FIG. 10 is a diagram showing an example of a cache management table.

FIG. 10 is a diagram showing an example of the cache management table 713.

The cache management table 713 is a table related to the cache 55. The cache management table 713 includes a dirty queue 1001, a clean queue 1002, a free queue 1003, and a cache segment management table 1004. In the present embodiment, there are a plurality of different segment sizes, and segments of the plurality of different segment sizes are prepared in advance. However, the segment size may be variable depending on a cache allocation request.

The dirty queue 1001 is a queue of an ID (address) of a dirty segment storing dirty data in which the drive 214 is a write destination for each drive 214. The "dirty segment" is a segment in which the dirty data is stored. The "dirty data" is data that is not written into the drive 214.

The clean queue 1002 is a queue of an ID (address) of a clean segment having the segment size for each segment size. The "clean segment" is a segment in which the clean data is stored. The "clean data" is data written in the drive 214.

The free queue 1003 is a queue of an ID (address) of a free segment having the segment size for each segment size. The "free segment" is a segment to which data may be newly written. A segment of a desired size is allocated from the free queue 1003, and data is written into the allocated segment.

The cache segment management table 1004 stores information related to the cache segment. More specifically, the cache segment management table 1004 stores, for each cache segment, information such as a segment ID 1041, a memory address 1042, a size 1043, a VOL ID 1044, a VOL address 1045, and a redundancy-and-non-volatile flag 1046.

The segment ID 1041 is an ID of the cache segment. The memory address 1042 is an address of the cache segment (address in the cache 55). The size 1043 is a size of the cache segment.

The VOL ID 1044 is an ID of the VOL 102 of a write destination of data in the cache segment. The VOL address 1045 is an address in the VOL 102 of the write destination (address of data at the write destination).

The redundancy-and-non-volatile flag 1046 includes the redundancy flag 2 and the non-volatile flag 3 corresponding to the cache segment. "1" means "on", and "0" means "off".

Hereinafter, an example of a process executed in the present embodiment will be described. In the description with reference to FIGS. 11 to 17, to avoid confusion, "P" is added to the end of the reference numerals of the program in the primary site 201P, and "S" is added to the end of the reference numerals of the programs in the secondary site 201S. In the following description, "initial JNL" means a JNL generated in initial copy, and "update JNL" means a JNL generated according to an update of the PVOL 102P after the initial copy.

Figure 11:
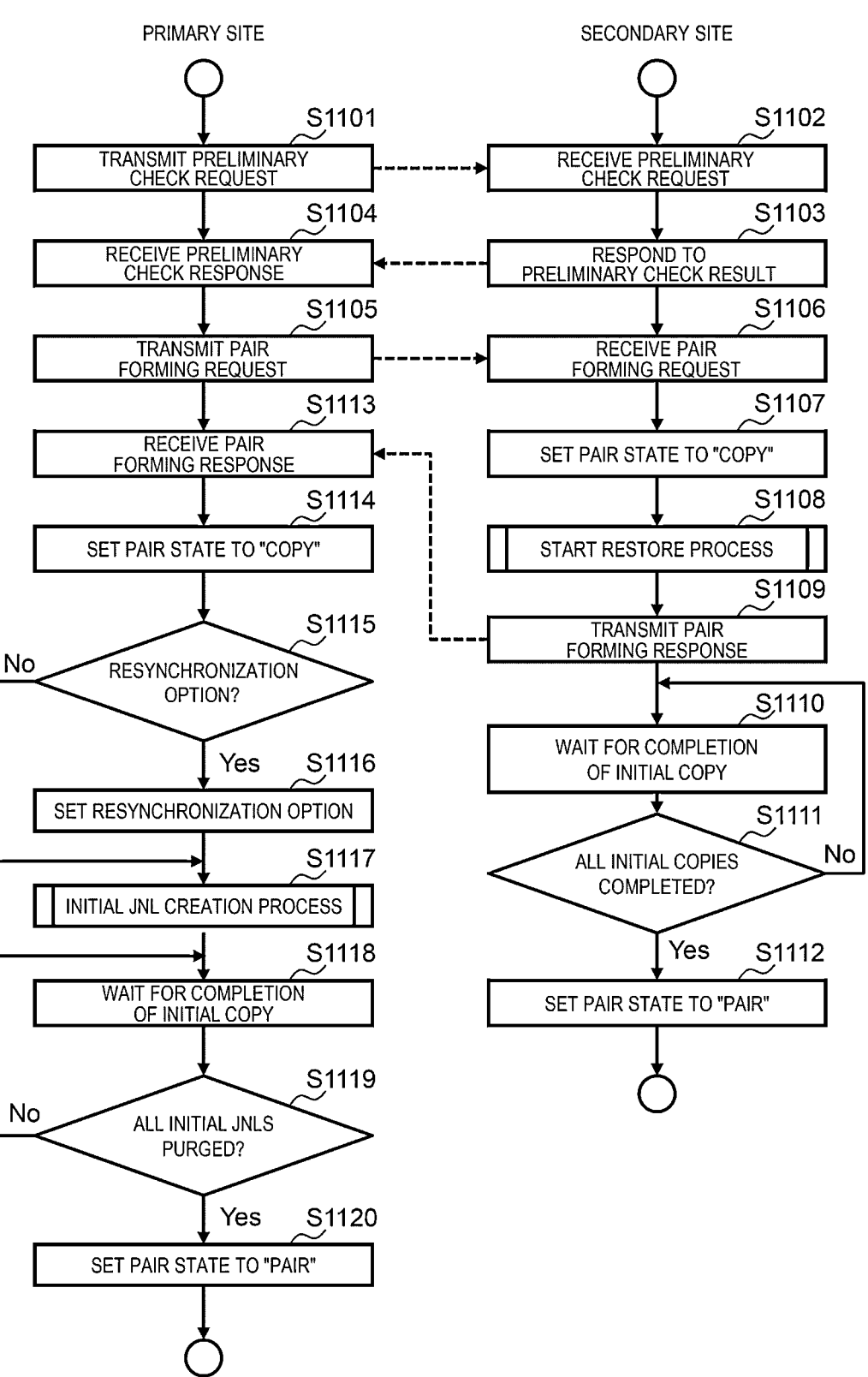
FIG. 11 is a diagram showing a flow of a pair forming process.

FIG. 11 is a diagram showing a flow of a pair forming process.

According to the pair forming process, a remote copy pair is formed by communication between the primary site 201P and the secondary site 201S. In the description of FIG. 11, a pair forming process program 721P is a program stored in the primary node 210P having a PVOL candidate. A pair forming process program 721S is a program stored in the secondary node 210S having an SVOL candidate.

The pair forming process program 721P transmits a preliminary check request to the pair forming process program 721S (S1101). The pair forming process program 721S receives the request (S1102), and performs predetermined preliminary check such as whether there is the VOL 102 to be paired and whether the information on a partner device is correct. The pair forming process program 721S returns a response to the preliminary check request (S1103). The response represents a result of the preliminary check. The pair forming process program 721P receives the response (S1104).

If the response is a predetermined response, the pair forming process program 721P transmits, to the pair forming process program 721S, a pair forming request in which the PVOL candidate is the PVOL 102P and the SVOL candidate is the SVOL 102S (S1105). The pair forming process program 721S receives the request (S1106), forms a VOL pair (registers information in the pair management table 920), and sets the state 926 of the pair to "COPY" (S1107). The pair forming process program 721S starts a restore process (FIG. 13) (S1108), and returns a response to the pair forming request (S1109). The pair forming process program 721S waits for completion of the initial copy (S1110). When the initial copy is completed (S1111: Yes), specifically, when synchronization of the data of the PVOL and the data of the SVOL is completed by a restore process program 723S, the pair forming process program 721S sets the state 926 of the pair to "PAIR" (S1112).

The pair forming process program 721P receives the response transmitted in S1109 (S1113). If the response is the predetermined response, the pair forming process program 721P forms a VOL pair (registers information in the pair management table 920), and sets the state 926 of the pair to "COPY" (S1114). If there is a resynchronization option in the pair (S1115: Yes), the pair forming process program 721P sets the resynchronization option (S1116).

The pair forming process program 721P starts the initial JNL creation process (S1117). The pair forming process program 721P waits for completion of the initial copy (S1118). When all the initial JNLs are purged (S1119: Yes), specifically, when synchronization of the data of the PVOL and the data of the SVOL is completed by a restore process program 723S, the pair forming process program 721P sets the state 926 of the pair to "PAIR" (S1120).

Figure 12:
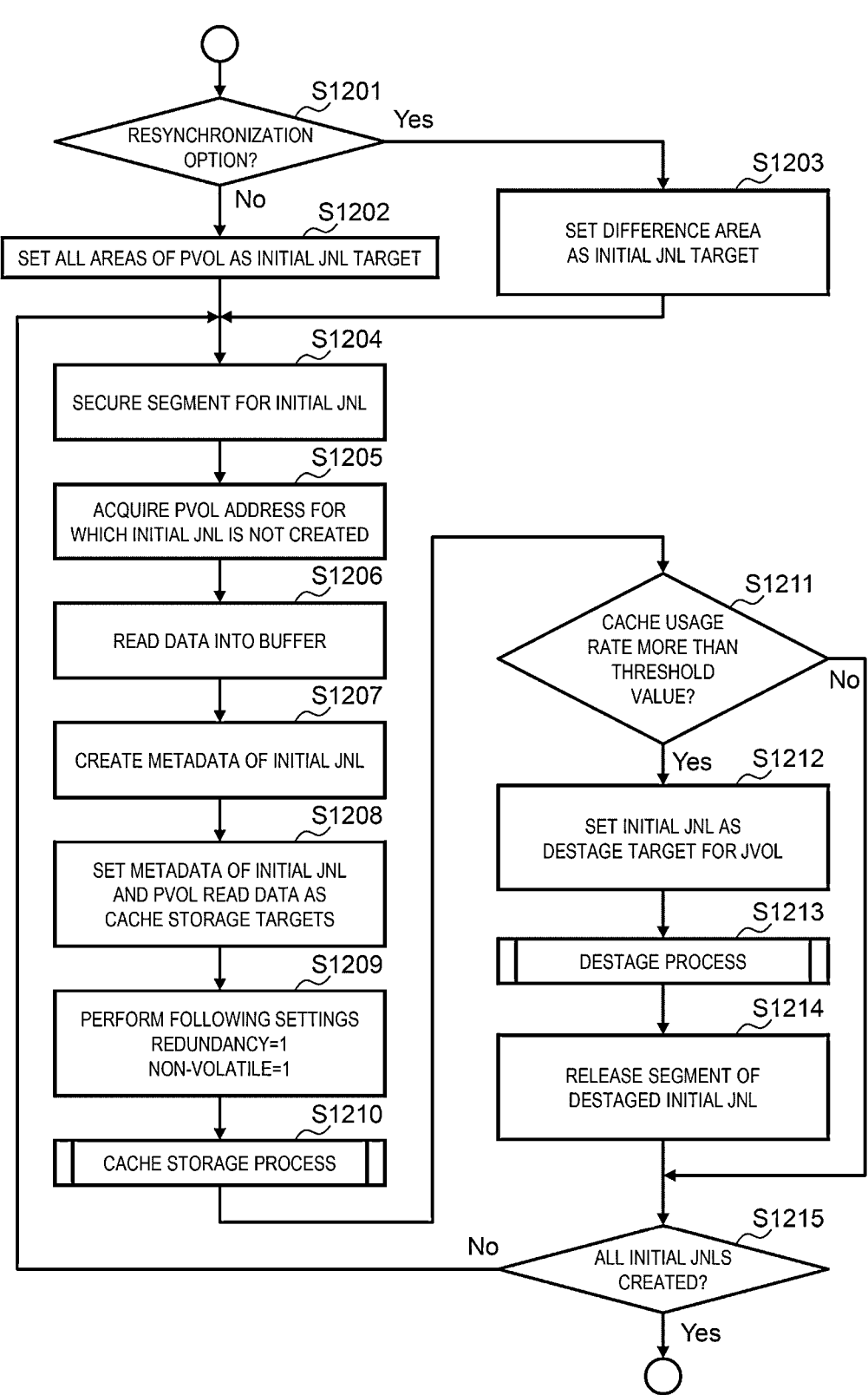
FIG. 12 is a diagram showing a flow of an initial JNL creation process at a primary site.

FIG. 12 is a diagram showing a flow of the initial JNL creation process at the primary site 201P.

When the initial JNL creation process is started, the process shown in FIG. 12 is performed. In the process, data of the PVOL 102P is generated as the initial JNL. The JNL is basically stored in the cache 55P, but if the cache is full, it is destaged to the PJVOL 102JP, and the destaged portion is purged from the cache 55P. The initial copy includes a full copy and a differential copy. When the pair status 926 is "SUSPEND", a JNL is created by the differential copy only for the update differential during the pair suspension. A redundancy flag and a non-volatile flag are set for the cache segment, and writing is controlled according to the flag.

If the resynchronization option is not set (S1201: No), an initial JNL creation process program 722P sets the data in all areas of the PVOL 102P as a creation target of the initial JNL (S1202). If the resynchronization option is set (S1201: Yes), the initial JNL creation process program 722P refers to a difference management table (not shown) indicating a difference between the PVOL 102P and the SVOL 102S, and sets data in a difference area as the creation target of the initial JNL (S1203).

The initial JNL creation process program 722P allocates a cache segment for the initial JNL based on the free queue 1003 (S1204), and acquires the VOL address 1045 corresponding to the segment (a PVOL address of a PVOL area having data to be included in the initial JNL) (S1205). The initial JNL creation process program 722P reads data from the address (S1206), creates metadata of the initial JNL (S1207), creates an initial JNL including the data read in S1206 and the metadata created in S1207, and sets the initial JNL as a storage target (S1208). The metadata includes, for example, a JNL ID, an LBA (VOL address), a transfer length, a pair ID, a PVOL ID, and an SVOL ID.

The initial JNL creation process program 722P sets the redundancy flag and the non-volatile flag in the redundancy-and-non-volatile flag 1046 to "1" for the segment allocated in S1204 (S1209). The initial JNL creation process program 722P starts a cache storage process (FIG. 15A) (S1210).

When a cache usage rate (for example, a ratio of a total capacity of the dirty segment and the clean segment to a total capacity of the cache 55P) is more than a predetermined value (S1211: Yes), the initial JNL creation process program 722P sets the initial JNL in the cache segment as a destage target (S1212) and starts a destage process (FIG. 15B) (S1213). The initial JNL creation process program 722P releases the cache segment having the initial JNL that is destaged to the PJVOL 102JP, that is, sets the cache segment as a free segment (S1214).

When there is an uncreated initial JNL (S1215: No), the process returns to S1204. When all the initial JNLs are created (S1215: Yes), the initial JNL creation process ends.

Figure 13:
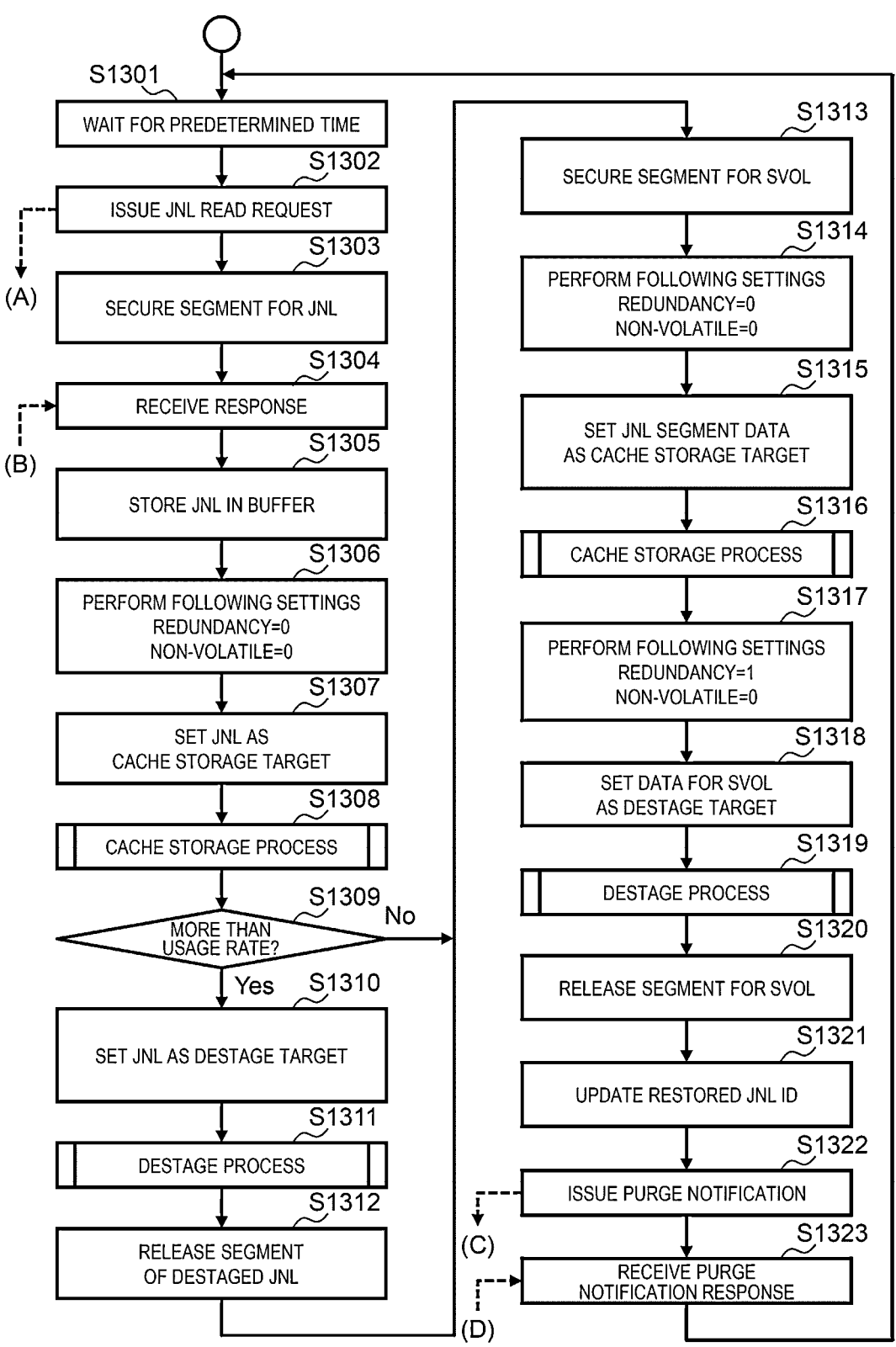
FIG. 13 is a diagram showing a flow of a restore process at a secondary site.

FIG. 13 is a diagram showing a flow of the restore process at the secondary site 201S.

When the restore process is started, the process shown in FIG. 13 is performed. In the process, the JNL from the primary site 201P is reflected in the SVOL 102S. By setting the redundancy flag and the non-volatile flag of the cache segment into which the JNL from the primary site 201P is written to "0", a processing load is reduced. When the JNL is lost when the secondary node fails, the JNL is retransferred from the primary site 201P, and a synchronization state between the PVOL and the SVOL is recovered. After the JNL is reflected in the SVOL 102S, a purge notification is issued to the primary site 102P to discard the JNL in the primary site 102P.

The restore process program 723S waits for a predetermined time (S1301), and transmits a JNL read request (S1302). In the request, an ID (for example, SEQ #) of a JNL to be read may be designated. The request is transmitted to the primary node 210P having the PVOL represented by the metadata of the JNL. In response to the request, S1401 of FIG. 14A is performed.

The restore process program 723S allocates the cache segment of the JNL to be read based on the free queue 1003 (S1303).

Figure 14A:
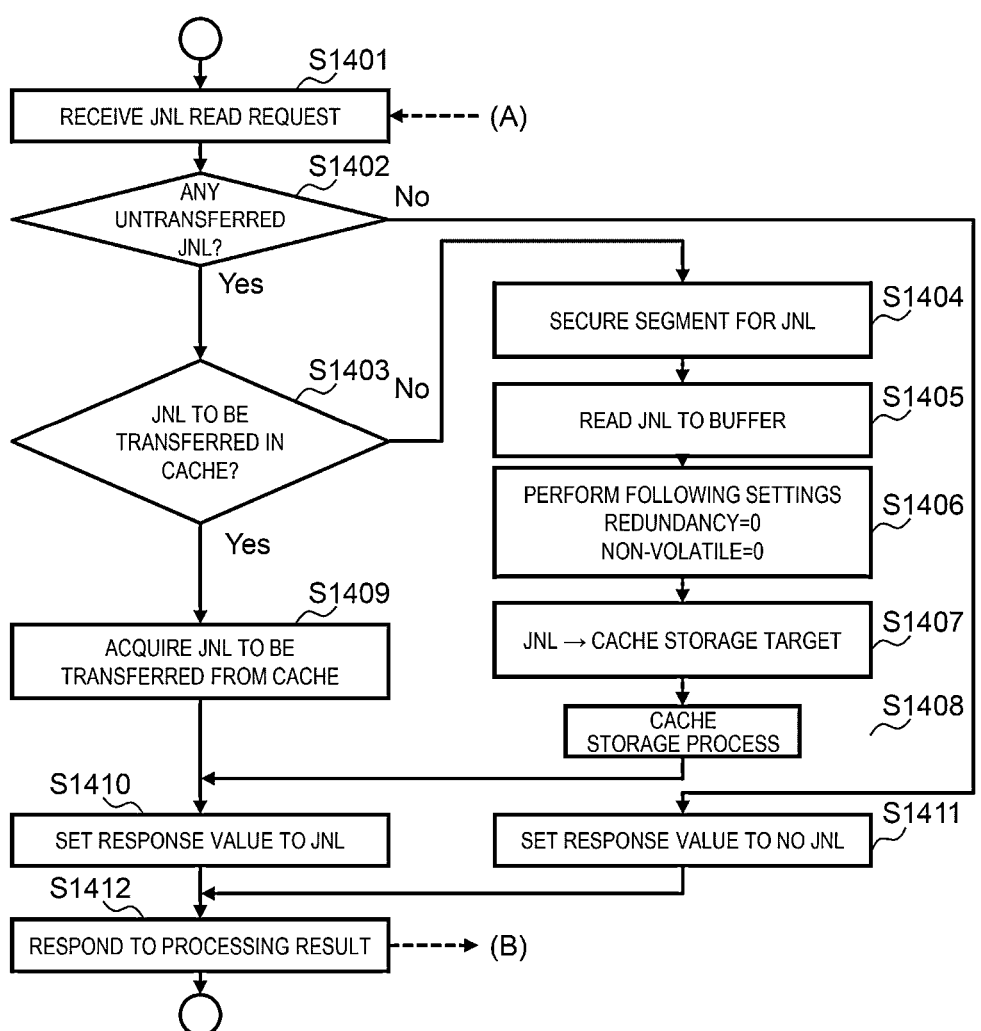
FIG. 14A is a diagram showing a flow of a JNL read process at the primary site.

When S1412 of FIG. 14A is performed, the restore process program 723S receives a response to the JNL read request transmitted in S1302 (S1304). The restore process program 723S stores the JNL included in the response in the buffer (S1305).

The restore process program 723S sets the redundancy flag and the non-volatile flag in the redundancy-and-non-volatile flag 1046 to "0" for the segment allocated in S1303 (S1306). The restore process program 723S sets the JNL stored in S1305 as a cache storage target (S1307), and starts the cache storage process (FIG. 15A) (S1308).

When the cache usage rate is more than a predetermined value (S1309: Yes), the restore process program 723S sets the JNL in the cache segment as a destage target (S1310), and starts the destage process (FIG. 15B) (S1311). The restore process program 723S releases the cache segment having the destaged JNL to the SJVOL 102JS (S1312).

When a determination result of S1309 is false (S1309: No), or after S1312, the restore process program 723S allocates a copy destination cache segment of the data in the JNL stored in the segment in S1308 based on the free queue 1003 (S1313). The restore process program 723S sets the redundancy flag and the non-volatile flag to "0" for the segment allocated in S1313 (S1314). The restore process program 723S sets the data in the JNL stored in the segment in S1308 as a cache storage target (S1315), and starts the cache storage process (FIG. 15A) (S1316).

Figure 14B:
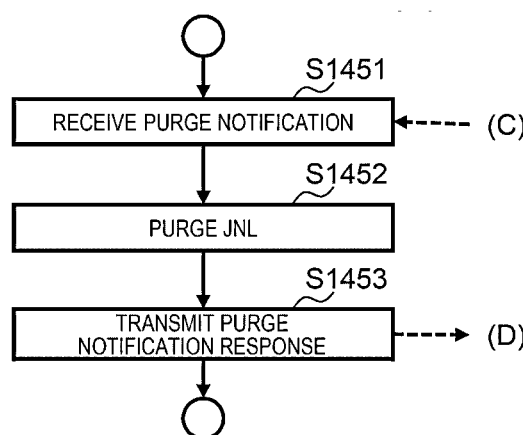
FIG. 14B is a diagram showing a flow of a JNL purge process at the primary site.

The restore process program 723S sets the redundancy flag to "1" and the non-volatile flag to "0" for the segment allocated in S1313 (S1317). The restore process program 723S sets the data in the segment allocated in S1313 as a destage target (S1318), and starts the destage process (FIG. 15B) (S1319). The restore process program 723S releases the cache segment having the destaged data to the SVOL 102S (S1320). The restore process program 723S updates the ID (SEQ #) of the restored (reflected) JNL (S1321), and transmits a purge notification including the updated JNL ID to the primary site 201P (S1322). In response to the notification, S1451 of FIG. 14B is performed. When S1453 of FIG. 14B is performed, the restore process program 723S receives a response to the notification transmitted in S1322 (S1323). The process returns to S1301.

FIG. 14A is a diagram showing a flow of a JNL read process at the primary site 201P.

A JNL read process program 724P receives a JNL read request (S1401) and determines whether there is a JNL that is not transferred to the secondary site 201S (S1402). For example, it may be determined whether a JNL ID designated in the request is an ID of an untransferred JNL.

When a determination result of S1402 is true (S1402: Yes), the JNL read process program 724P determines whether the untransferred JNL is cached (S1403).

When a determination result of S1403 is false (S1403: No), the JNL read process program 724P allocates the cache segment of the JNL (S1404), and reads the JNL from the PJVOL 102JP to the buffer (S1405). The JNL read process program 724P sets the redundancy flag and the non-volatile flag to "0" for the segment allocated in S1404 (S1406). The JNL read process program 724P sets the JNL read in S1405 as a cache storage target (S1407), and starts the cache storage process (FIG. 15A) (S1408). The JNL read process program 724P includes the JNL in a response to the JNL read request received in S1401 (S1410) and returns the response (S1412).

When the determination result of S1403 is true (S1403: Yes), the JNL read process program 724P acquires a transfer target JNL from the cache 55P (S1409), includes the JNL in a response to the JNL read request (S1410), and returns the response (S1412). The "transfer target JNL" may be a JNL having a smallest JNL ID among the untransferred JNLs.

When the determination result of S1402 is false (S1402: No), the JNL read process program 724P includes a value indicating no JNL in a response to the JNL read request (S1411), and returns the response (S1412).

FIG. 14B is a diagram showing a flow of a JNL purge process at the primary site 201P.

A JNL purge process program 725P receives a purge notification including a JNL ID (S1451), purges all JNLs with JNL IDs up to the JNL ID indicated by the notification from the PJVOL 102JP, and returns a response indicating completion (S1453). The purge notification may be included as a parameter in the JNL read request.

Figure 15A:
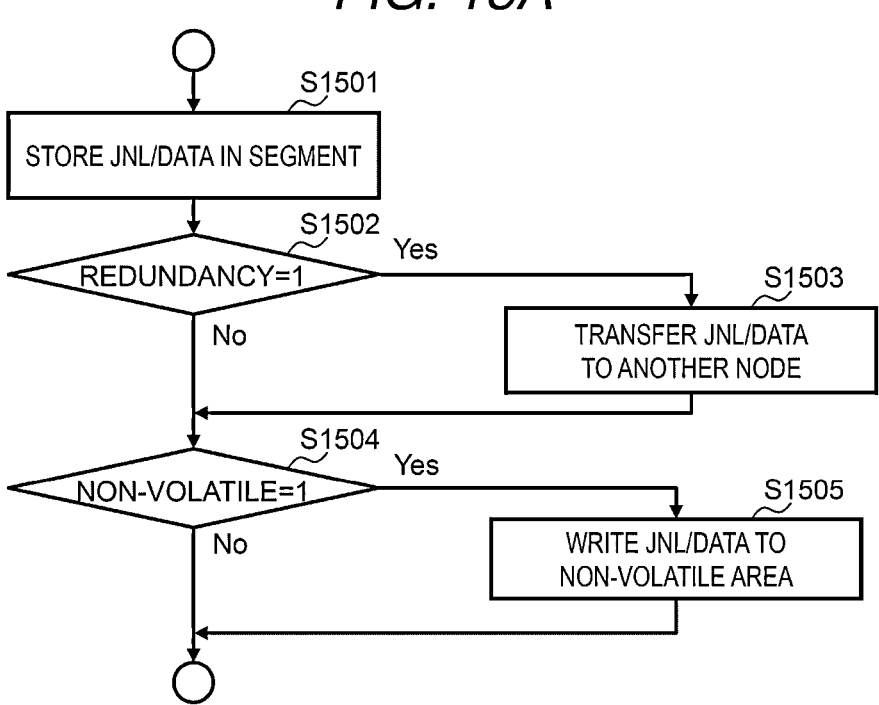
FIG. 15A is a diagram showing a flow of a cache storage process at a secondary site.

FIG. 15A is a diagram showing a flow of the cache storage process at the secondary site 201S.

When the cache storage process is started, the process shown in FIG. 15A is performed. In the process, the JNL or the data to be stored in the cache is stored in the allocated cache segment, and whether the JNL or data is made redundant or non-volatile is controlled according to the flag.

A cache storage process program 726S stores the JNL or the data in the allocated cache segment (S1501).

When the redundancy flag corresponding to the segment is "1" (S1502: Yes), the cache storage process program 726S transfers the JNL or the data in the segment to another secondary node 210S (S1503). In other words, when the redundancy flag corresponding to the segment is "O" (S1502: No), the cache storage process program 726S skips transferring the JNL or the data in the segment to another secondary node 210S.

When the non-volatile flag corresponding to the segment is "1" (S1504: Yes), the cache storage process program 726S writes the JNL or the data in the segment into the non-volatile area 103S (S1505). In other words, when the non-volatile flag corresponding to the segment is "O" (S1504: No), the cache storage process program 726S skips writing the JNL or the data in the segment into the non-volatile area 103S.

Figure 15B:
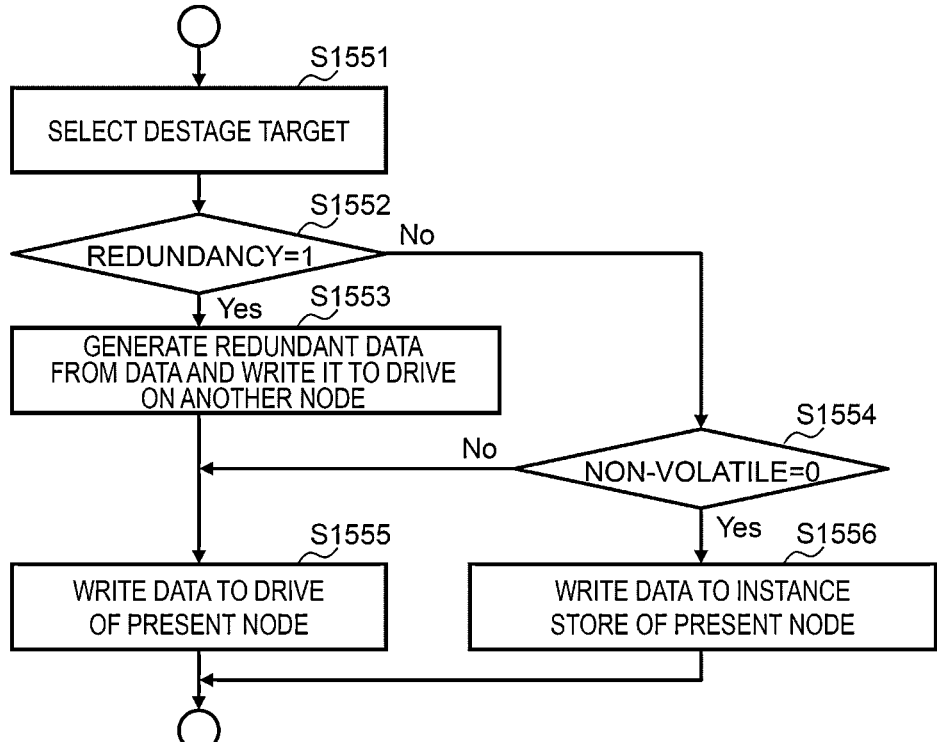
FIG. 15B is a diagram showing a flow of a destage process at the secondary site.

FIG. 15B is a diagram showing a flow of the destage process at the secondary site 201S.

When the destage process is started, the process shown in FIG. 15B is performed. In the process, the JNL is written from the segment of the cache 55S to the SJVOL 102JS, or the data is written from the segment to the SVOL 102S. At this time, if the redundancy flag corresponding to the segment is "1", the JNL or the data is made redundant in another secondary node. When the redundancy flag is "0", the JNL or the data may be written in the instance store of the secondary node.

A destage process program 727S selects a JNL or data to be destage (S1551). Specifically, a dirty segment is selected from the dirty queue 1001.

When the redundancy flag corresponding to the segment having the selected JNL or data is "1" (S1552: Yes), the destage process program 727S transfers the JNL or the data to another secondary node 210S (S1553), and writes the JNL or the data into the SJVOL 102JS or the SVOL 102S of the present secondary node 210S (S1555).

When the non-volatile flag corresponding to the segment having the selected JNL or data is "0" (S1552: No, S1554: Yes), the destage process program 727S writes the JNL or the data into the instance store of the present secondary node 210S (S1556). S1555 may be performed instead of S1556.

Figure 16:
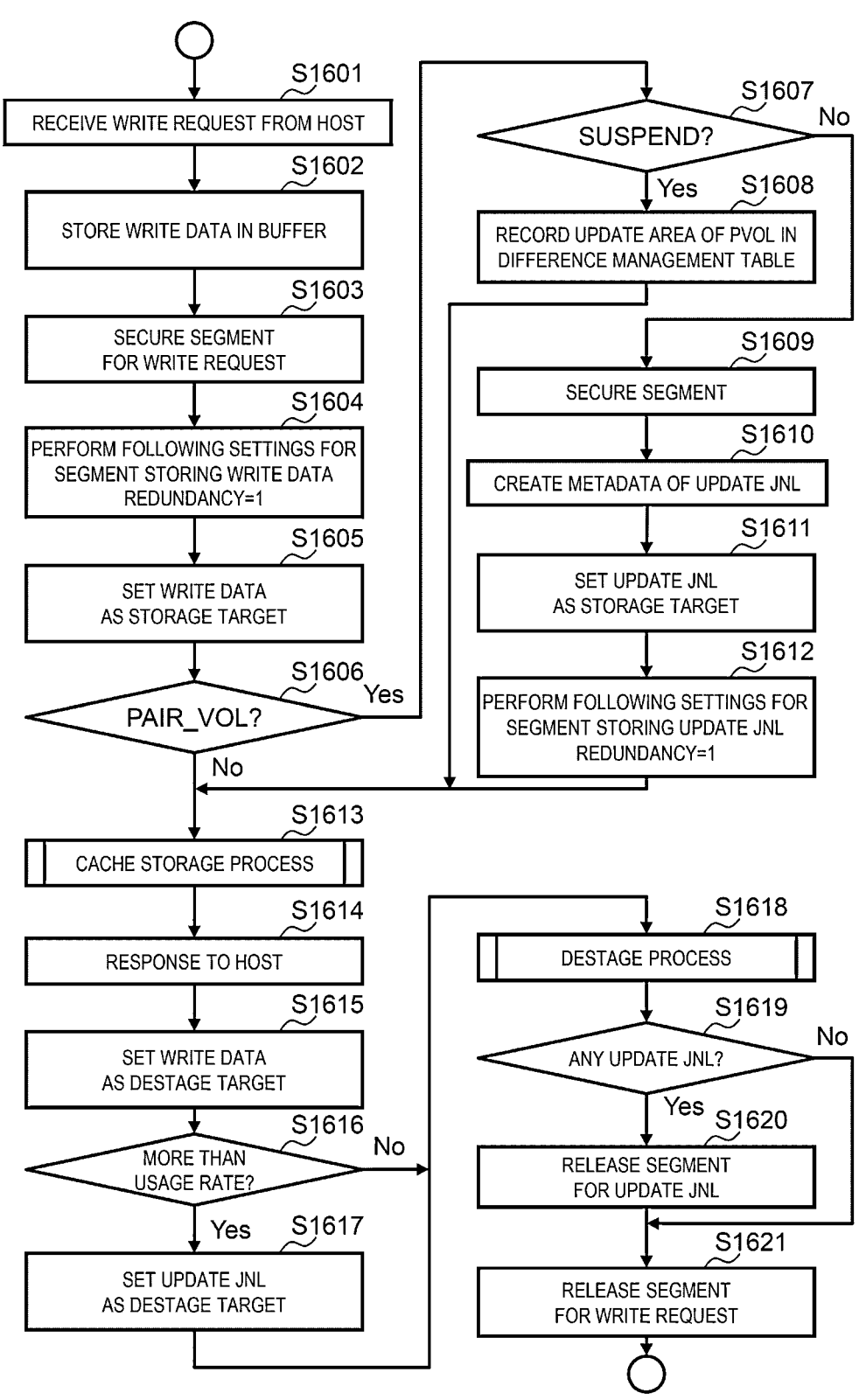
FIG. 16 is a diagram showing a flow of an update JNL creation process at a primary site.

FIG. 16 is a diagram showing a flow of the update JNL creation process at the primary site 201P.

In the process, an update JNL is created in response to a write request from the host 51. Similarly to the initial JNL, the update JNL is transferred to the secondary site 201S by the restore process of the secondary site 201S, and is reflected in the SVOL 102S. When the update JNL in the primary site 201P is lost by the node failure, the update JNL cannot be recovered. Therefore, the data and the JNL on the cache are made redundant and non-volatile.

An update JNL creation process program 728P receives a write request (S1601), and stores write data (write target data) accompanying the write request in the buffer (S1602). The update JNL creation process program 728P allocates a cache segment of the write data from the free queue 1003 (S1603), sets the redundancy flag of the segment to "1", and sets the write data as a storage target (S1605).

The update JNL creation process program 728P determines whether the attribute 915 of the VOL 102 designated in the write request is "PAIR_VOL", that is, whether the VOL 102 is the PVOL 102P (S1606).

When a determination result of S1606 is true (S1606: Yes), the update JNL creation process program 728P determines whether the state 926 of the pair including the VOL is "SUSPEND" (S1607). When a determination result of S1607 is true (S1607: Yes), the update JNL creation process program 728P updates a difference management table representing the difference between the PVOL 102P and the SVOL 102S according to an address of a write destination according to the write request (S1608).

When the determination result of S1607 is false (S1607: No), the update JNL creation process program 728P allocates the cache segment of the update JNL (S1609). The update JNL creation process program 728P creates metadata of the update JNL (S1610), sets the update JNL as a cache storage target (S1611), and sets the redundancy flag of the segment to "1" (S1612).

When the determination result of S1606 is false (S1606: No), after S1608, or after S1612, the update JNL creation process program 728P starts the cache storage process (FIG. 15A) (S1613), and returns a response to the write request to the host 51 (S1614).

The update JNL creation process program 728P sets the write data as a destage target (S1615), and determines whether the cache usage rate is more than a predetermined value (S1616). When a determination result of S1616 is true (S1616: Yes), the update JNL creation process program 728P sets the update JNL as the destage target (S1617).

When the determination result of S1616 is false (S1616: No), or after S1617, the update JNL creation process program 728P starts the destage process (FIG. 15B) (S1618), releases the cache segment having the destaged update JNL (S1619: Yes, S1620), and releases the cache segment having the destaged write data (S1621).

In the process shown in FIG. 16, the update JNL creation process program 728P may set the non-volatile flag to "1" for either the cache segment of the write data or the cache segment of the update JNL, and write the write data or the update JNL in the segments into the non-volatile area 103P.

Figure 17:
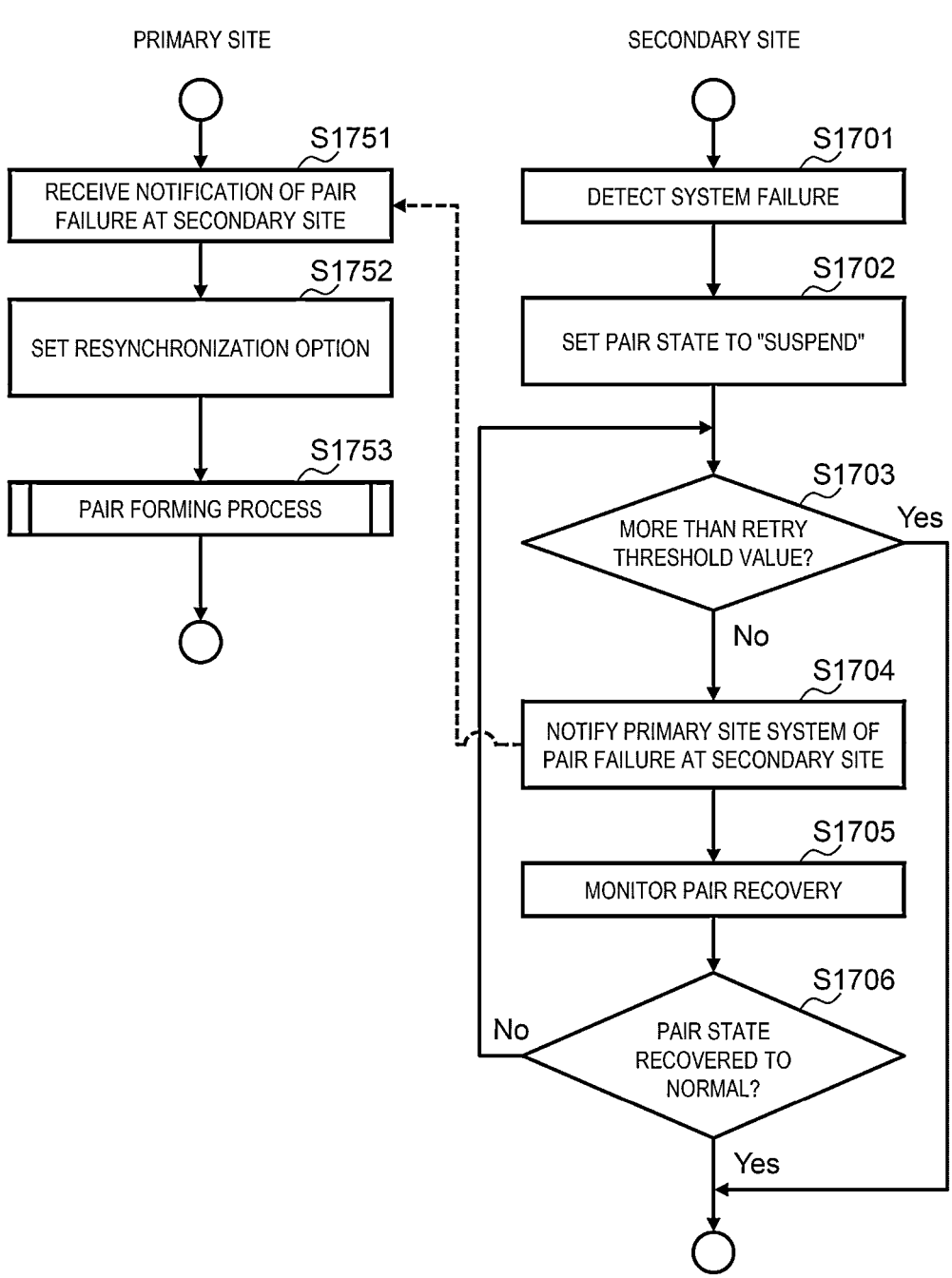
FIG. 17 is a diagram showing a flow of a pair recovery process.

FIG. 17 is a diagram showing a flow of a pair recovery process.

In the process, the secondary site 201S detects a failure, transitions the state of a pair to "SUSPEND", and notifies the primary site 201P of the failure. In response to the notification, the JNL is retransferred from the primary site 201P to the secondary site 201S. The pair is recovered using the retransferred JNL. For example, when the network 202 is temporarily disconnected and the state of the pair is "SUSPEND", and then the network 202 is recovered, the pair recovery process may be performed. In the present embodiment, when the state of the pair transitions to "SUSPEND", the pair recovery is automatically performed. The "failure" in the paragraph may include a node failure, a power failure, or a drive failure in addition to a network failure. In response to the failure in the primary site 201P, the state of the pair in the primary site 201P is set to "SUSPEND", and the state may be notified to the secondary site 201S, or the pair recovery may be performed in response to the notification.

The pair recovery process program 729S detects a failure in the secondary site 201S (51701), and sets the status 926 of the VOL pair affected by the failure to "SUSPEND" (S1702). A pair recovery process program 729S determines whether the number of times of execution of a series of processes of S1704 to S1706 is more than a retry threshold value (S1703).

When a determination result of S1703 is false (S1703: No), the pair recovery process program 729S performs a series of processes of S1704 to S1706. That is, the pair recovery process program 729S notifies the primary node 210P having the PVOL 102P belonging to the pair of the failure of the pair whose state 926 is "SUSPEND" in S1702 (S1704), monitors the recovery of the pair (S1705), and determines whether the pair state is recovered to normal (S1706). When a determination result of S1705 is true (S1705: Yes), the process of the pair recovery process program 729S ends. When the determination result of S1705 is false (S1705: No), the process returns to S1703.

The pair recovery process program 729P receives the notification of the failure of the pair from the pair recovery process program 729S (S1751), sets the resynchronization option (S1752), and starts the pair forming process (FIG. 11) (S1753).

Although one embodiment according to the invention has been described above, the embodiment is an example for describing the invention, and the scope of the invention is not limited to the embodiment. The invention can be implemented in various other aspects.

The above description can be summarized as follows. The following summary may include a supplementary description of the above description and a description of modifications. In the following description, the subject of the processing is the processor 211, but specifically, for example, the subject of the processing may be the SCS 720. In addition, in the following description, reference numerals of elements are mainly described with reference to FIG. 1.

The plurality of nodes 210 each including the memory 212 provided with the cache 55 and the processor 211 connected to the memory 212 are provided. In each of the plurality of nodes 210, when there is data to be stored in the segment allocated from the cache 55, the processor 211 determines, for the segment, according to a type of the data, whether redundancy (redundant data of data in the segment is transferred to another node) and whether non-volatilization (data in the segment is stored in the non-volatile area 103) are required, and controls, based on the determination, whether to perform the redundancy of data in the segment and whether to perform the non-volatilization of data in the segment. In each of the plurality of nodes 210, the non-volatile area 103 is an area based on one or more non-volatile media inside or outside the node 210 (the non-volatile medium may be referred to as a permanent storage device, and an example of the non-volatile medium is the drive 214). Accordingly, it is possible to appropriately reduce a frequency of writing from the cache 55 to a non-volatile medium in the storage system 100 including the plurality of nodes 210.

The following description adopts determination of the value of the redundancy flag 2 as an example of determining whether the redundancy is required. However, in the present invention, the determination of whether the redundancy is required is not limited to the determination of the value of the redundancy flag 2. Similarly, the following description adopts determination of the value of non-volatile flag 3 as an example of determining whether the non-volatilization is required. However, in the present invention, the determination of whether the redundancy is required is not limited to the determination of the value of non-volatile flag 3 (for example, information in a form other than a flag may be adopted). In the following description, the "redundant data" may be replicate data (for example, a JNL or a replicate of the data contained in the JNL) or parity data (for example, a JNL or parity data of the data contained in the JNL).

The plurality of nodes 210 may be the plurality of secondary nodes 210S constituting the secondary storage system 100S. Among the plurality of secondary nodes 210, the first secondary node 210S1 may have the SJVOL 102JS1A which is the VOL 102 in which a JNL is stored, the SVOL 102S1A which forms a pair with the PVOL 102P1A in the primary storage system 100P, the first secondary cache 55S1 which is the cache 55 in the secondary node 210S1, and a first secondary processor which is the processor 211 in the secondary node 210S1 (hereinafter, for convenience, referred to as the "211S1"). The JNL may include data to be written into the PVOL 102P1A in the primary storage system 100P, and metadata including a SEQ #(sequence number) which is an order in which the data is written. In the above embodiment, an example of the SEQ # is the JNL ID. The first secondary processor 211S1 may allocate the segment in which the JNL is stored from the first secondary cache 55S1. When the data stored in the allocated segment is the JNL, the first secondary processor 211S1 may set both the redundancy flag 2 and the non-volatile flag 3 for the segment to "off". When both the redundancy flag 2 and the non-volatile flag 3 for the segment are "off", the first secondary processor 211S1 performs neither the redundancy, which is to write the JNL in the segment into the SJVOL 102JS1A and transfer the redundant data of the JNL in the segment to the second secondary node 210S2 having the SVOL 102S1S, which is a mirror VOL of the SVOL 102S1A, nor the non-volatilization, which is to store the JNL in the segment in the non-volatile area 103S1. Accordingly, it is possible to appropriately reduce a frequency of writing from the cache 55S into a non-volatile medium in asynchronous remote copy using the JNL. Even when the frequency of such writing is reduced, if the JNL or the data is lost in the secondary node 210S1 or 210S2, the JNL or the data can be recovered using the JNL from the primary storage system 100P. For each of the plurality of secondary nodes 210S, the VOL 102 (the SJVOL 102JS and the SVOL 102S) may be an area based on one or more non-volatile media inside or outside the secondary node 210S.

The first secondary processor 211S1 allocates, from the first secondary cache 55S1, a segment in which the data in the JNL is stored, and when the data stored in the allocated segment is the data in the JNL, the redundancy flag 2 for the segment may be set to "on" and the non-volatile flag 3 may be set to "off". When the redundancy flag 2 for the segment is "on" and the non-volatile flag 3 is "off", the first secondary processor 211S1 performs the redundancy, which is to write the data in the segment into the SVOL 102S1A and transfer the redundant data of the data in the segment to the second secondary node 210S2, but does not perform the non-volatilization, which is to store the data in the segment in the non-volatile area 103S1. Accordingly, it is possible to appropriately reduce a frequency of writing from the cache 55S into a non-volatile medium in asynchronous remote copy. A second secondary processor (hereinafter, for convenience, referred to as "211S2"), which is the processor 211 in the second secondary node 210S2, may allocate a segment from the second secondary cache 55S2, which is the cache 55 in the secondary node 210S2, store redundant data from the first secondary node 210S1 in the segment, and write the data in the segment into the SVOL 102S1S. The second secondary processor 211S2 may set both the redundancy flag 2 and the non-volatile flag 3 for the segment to "off" since the data in the segment is redundant data from another secondary node 210S.

The primary storage system 100P may include the plurality of nodes 210, that is, the plurality of primary nodes 210P1. Among the plurality of primary nodes 210P1, the first primary node 210P1 may have a PJVOL 102PJ1A which is the VOL 102 in which the JNL is stored, the PVOL 102P1A, the first primary cache 55P1 which is the cache 55 in the primary node 210P1, and a first primary processor which is the processor 211 in the primary node 210P1 (hereinafter, for convenience, referred to as "211P1"). The first primary processor 211P1 allocates, from the first primary cache 55P1, a segment in which the JNL is stored, and when the data stored in the allocated segment is the JNL, both the redundancy flag 2 and the non-volatile flag 3 for the segment may be set to "on". When both the redundancy flag 2 and the non-volatile flag 3 for the segment are "on", the first primary processor 211P1 may perform both the redundancy, which is to write the JNL in the segment into the PJVOL 102PJ1A and transfer the redundant data of the JNL in the segment to the second primary node 210P2 having the PVOL 102JP1S, which is a mirror VOL of the PVOL 102P1A, and the non-volatilization, which is to store the JNL in the segment in the non-volatile area 103P1. Accordingly, it is possible to increase certainty that the JNL required for recovery in the secondary storage system 100S exists in the primary storage system 100P. For each of the plurality of primary nodes 210P1, the VOL 102 (the PJVOL 102JP and the PVOL 102P) may be an area based on one or more non-volatile media inside or outside the primary node 210P1. A second primary processor (hereinafter, for convenience, referred to as "211P2"), which is the processor 211 in the second primary node 210P2, may allocate a segment from the second primary cache 55P2, which is the cache 55 in the primary node 210P2, store redundant data (redundant data of the JNL) from the first primary node 210P1 in the segment, and write the data in the segment into the PJVOL 102JP1S. The second primary processor 211P2 may set the redundancy flag 2 for the segment to "off" but the non-volatile flag 3 to "on" since the data in the segment is redundant data from another primary node 210P. Therefore, the second primary processor 211P2 may store the data in the segment in the non-volatile area 103P2.

The first primary processor 211P1 allocates, from the first primary cache 55P1, a segment in which data to be included in the JNL and data from the host 51 is stored, and when the data stored in the allocated segment is the data from the host 51 (the data to be written into the PVOL 102JP1A), both the redundancy flag 2 and the non-volatile flag 3 for the segment may be set to "on". When both the redundancy flag 2 and the non-volatile flag 3 for the segment are "on", the first primary processor 211P1 may perform both the redundancy, which is to write the data in the segment into the PVOL 102P1A and transfer the redundant data of the data in the segment to the second primary node 210P2, and the non-volatilization, which is to store the data in the segment in the non-volatile area 103P1. Accordingly, it is possible to increase the possibility that the JNL required for recovery in the secondary storage system 100S can be re-generated in the primary storage system 100P. The second primary processor 211P2 may allocate a segment from the second primary cache 55P2, store redundant data from the first primary node 210P1 in the segment, and write the data in the segment into the PVOL 102P1S. The second primary processor 211P2 may set the redundancy flag 2 for the segment to "off" but the non-volatile flag 3 to "on" since the data in the segment is redundant data from another primary node 210P. Therefore, the second primary processor 211P2 may store the data in the segment in the non-volatile area 103P2.

When the non-volatile flag 3 is set to "off" for the segment, the processor 211 (for example, either the secondary processor 211S or the primary processor 211P) may write the data in the segment into the instance store 65 in the node 210 having the processor 211. The instance store 65 may be an area based on a volatile storage medium.

The first secondary processor 211S1 may update the SEQ # of the reflected JNL after the data is written into the SVOL 102S1A (and the SVOL 102S1S), and notify the primary storage system 100P of the updated SEQ #. The primary storage system 100P may purge, from the primary storage system 100P, the JNL having the SEQ # up to the SEQ # notified by the first secondary processor 211S1. In this way, the JNL can be saved in the primary storage system 100P until the JNL is reflected in the SVOL 102S1A (and the SVOL 102S1S).

When the first secondary processor 211S1 detects that a failure occurs in a pair, the first secondary processor 211S1 may notify the primary storage system 100P of the failure in the pair. The first secondary node 210S1 receives a JNL including data as a difference between the SVOL 102S1A and the PVOL 102P1A from the primary storage system 100P that receives the notification, and the first secondary processor 211S1 allocates a segment from the first secondary cache 55S1 and stores the JNL in the segment. As a result, the above-described process is performed, and therefore recovery from the failure is performed automatically. For example, pair formation of the SVOL 102S1A and the PVOL 102P1A may be performed in response to a pair forming request from the primary storage system 100P. In response to the above-described notification of the failure, the first secondary node 210S1 receives the pair forming request from the primary storage system 100P, and in a process performed in response to the pair forming request, the first secondary node 210S1 may receive a JNL including the data as the difference from the primary storage system 100P. That is, when the failure in the pair is detected, recovery from the failure can be automatically performed by re-running a pair formation process.

What is claimed is:

1. A storage system comprising:
a plurality of nodes each including a memory in which a cache is provided and a processor connected to the memory, wherein
in each of the plurality of nodes, when there is data to be stored in a segment allocated from the cache, the processor is configured to:
  determine, for the segment, whether redundancy which is to transfer redundant data of the data in the segment to another node is required, and whether non-volatilization which is to store the data in the segment into a non-volatile area is required according to a type of the data, and
  control, based on the determination, whether to perform the redundancy of the data in the segment and whether to perform the non-volatilization of the data in the segment, and
for each of the plurality of nodes, the non-volatile area is an area based on one or more non-volatile media inside or outside the node,
the plurality of nodes are a plurality of secondary nodes constituting a secondary storage system,
among the plurality of secondary nodes, a first secondary node has
  a secondary journal volume which is a volume in which a journal is stored, the journal including data to be written into a primary volume in a primary storage system and metadata including a sequence number indicating an order in which the data is to be written,
  a secondary volume that forms a pair with the primary volume in the primary storage system,
  a first secondary cache that is a cache in the secondary node, and a first secondary processor that is a processor in the secondary node,
the first secondary processor is configured to:
  allocate, from the first secondary cache, the segment in which the journal is to be stored,
  when the data to be stored in the allocated segment is the journal, determine for the segment that the redundancy is not required, and
  when it is determined for the segment that the redundancy is not required, not perform the redundancy which is to write the journal in the segment to the secondary journal volume and transfer the redundant data of the journal in the segment to a second secondary node having a secondary mirror volume that is a mirror volume of the secondary volume, and
  for each of the plurality of secondary nodes, the volume is an area based on one or more non-volatile media inside or outside the secondary node.

2. The storage system according to claim 1, wherein
when the data to be stored in the allocated segment is the journal, determine for the segment that the that the non-volatilization is not required, and
when it is determined for the segment that neither the redundancy nor the non-volatilization is required, perform neither the redundancy, nor the non-volatilization which is to store the journal in the segment into the non-volatile area, and
for each of the plurality of secondary nodes, the volume is an area based on one or more non-volatile media inside or outside the secondary node.

3. The storage system according to claim 2, wherein
the first secondary processor is configured to:
  allocate, from the first secondary cache, the segment in which the data in the journal is to be stored,
  when the data stored in the allocated segment is the data in the journal, determine for the segment that the redundancy is required and that the non-volatilization is not required, and
  when it is determined for the segment that the redundancy is required but the non-volatilization is not required, perform the redundancy which is to write the data in the segment to the secondary volume and transfer the redundant data of the data in the segment to the second secondary node, but does not perform the non-volatilization which is to store the data in the segment into the non-volatile area.

4. The storage system according to claim 2, wherein
the primary storage system includes a plurality of primary nodes which are the plurality of nodes,
among the plurality of primary nodes, a first primary node has a primary journal volume which is a volume in which a journal is stored, the primary volume, a first primary cache which is a cache in the primary node, and a first primary processor which is a processor in the primary node,
the first primary processor is configured to:
  allocate, from the first primary cache, the segment in which the journal is to be stored,
  when the data to be stored in the allocated segment is the journal, determine for the segment that the redundancy is required, and that the non-volatilization is also required, and
  when it is determined for the segment that both the redundancy and the non-volatilization are required, perform both the redundancy which is to write the journal in the segment to the primary journal volume and transfer the redundant data of the journal in the segment to a second primary node having a primary mirror volume that is a mirror volume of the primary volume, and the non-volatilization, which is to store the journal in the segment in the non-volatile area, and for each of the plurality of primary nodes, the volume is an area based on one or more non-volatile media inside or outside the primary node.

5. The storage system according to claim 4, wherein the first primary processor is configured to:

allocate, from the first primary cache, the segment in which data included in a journal and from a host is to be stored, when the data to be stored in the allocated segment is the data from the host, determine for the segment that the redundancy is required and that the non-volatilization is also required, and when it is determined for the segment that both the redundancy and the non-volatilization are required, perform both the redundancy which is to write the data in the segment to the primary volume and transfer the redundant data of the data in the segment to the second primary node, and the non-volatilization which is to store the data in the segment into the non-volatile area.

6. The storage system according to claim 2, wherein the first secondary processor is configured to update the sequence number of the journal that is already reflected after the data is written to the secondary volume, and notify the primary storage system of the updated sequence number, and the primary storage system is configured to purge, from the primary storage system, the journal having the sequence number up to the sequence number notified by the first secondary processor.

7. The storage system according to claim 2, wherein the first secondary processor is configured to, when it is detected that a failure occurs in the pair, notify the primary storage system of the failure in the pair, and the first secondary node receives a journal including data representing a difference between the secondary volume and the primary volume from the primary storage system that receives the notification, and the first secondary processor is configured to allocate the segment from the first secondary cache and store the journal into the segment.

8. The storage system according to claim 7, wherein the pair including the secondary volume and the primary volume is formed in response to a pair forming request from the primary storage system, and in response to the notification, the first secondary node receives the pair forming request from the primary storage system, and in a process performed in response to the pair forming request, the first secondary node receives the journal including the data as the difference from the primary storage system.

9. The storage system according to claim 1, wherein the processor is configured to, when it is determined for the segment that the non-volatilization is not required, write the data in the segment to an instance store in one of the nodes which includes the processor.

10. The storage system according to claim 1, wherein the redundant data is replicate data or parity data.

11. A storage control method to be executed by each of a plurality of nodes constituting a storage system, the method comprising:

when there is data to be stored into a segment allocated from a cache, the node performing redundancy-and-non-volatilization determination that is determination for the segment as to whether redundancy which is to transfer redundant data of the data in the segment to another node is required, and whether non-volatilization which is to store the data in the segment into a non-volatile area is required according to a type of the data, and the node controlling, based on the determination, whether to perform the redundancy of the data in the segment and whether to perform the non-volatilization of the data in the segment, wherein the plurality of nodes are a plurality of secondary nodes constituting a secondary storage system, among the plurality of secondary nodes, a first secondary node has a secondary journal volume which is a volume in which a journal is stored, the journal including data to be written into a primary volume in a primary storage system and metadata including a sequence number indicating an order in which the data is to be written, a secondary volume that forms a pair with the primary volume in the primary storage system, a first secondary cache that is a cache in the secondary node, and a first secondary processor that is a processor in the secondary node, the first secondary processor is configured to:

allocate, from the first secondary cache, the segment in which the journal is to be stored, when the data to be stored in the allocated segment is the journal, determine for the segment that the redundancy is not required, and when it is determined for the segment that the redundancy is not required, not perform the redundancy which is to write the journal in the segment to the secondary journal volume and transfer the redundant data of the journal in the segment to a second secondary node having a secondary mirror volume that is a mirror volume of the secondary volume, and for each of the plurality of secondary nodes, the volume is an area based on one or more non-volatile media inside or outside the secondary node.

12. A storage system comprising:

a plurality of nodes each including a memory in which a cache is provided and a processor connected to the memory, wherein in each of the plurality of nodes, when there is data to be stored in a segment allocated from the cache, the processor is configured to:

determine, for the segment, whether redundancy which is to transfer redundant data of the data in the segment to another node is required, and whether non-volatilization which is to store the data in the segment into a non-volatile area is required according to a type of the data, and control, based on the determination, whether to perform the redundancy of the data in the segment and whether to perform the non-volatilization of the data in the segment, and for each of the plurality of nodes, the non-volatile area is an area based on one or more non-volatile media inside or outside the node, the plurality of nodes are a plurality of secondary nodes constituting a secondary storage system, among the plurality of secondary nodes, a first secondary node has a secondary journal volume which is a volume in which a journal is stored, the journal including data to be written into a primary volume in a primary storage system and metadata including a sequence number indicating an order in which the data is to be written, a secondary volume that forms a pair with the primary volume in the primary storage system, a first secondary cache that is a cache in the secondary node, and a first secondary processor that is a processor in the secondary node, the first secondary processor is configured to:

allocate, from the first secondary cache, the segment in which the journal is to be stored, when the data to be stored in the allocated segment is the journal, determine for the segment that the non-volatilization is not required, and when it is determined for the segment that the non-volatilization is not required, not perform the non-volatilization which is to store the journal in the segment into the non-volatile area, and for each of the plurality of secondary nodes, the volume is an area based on one or more non-volatile media inside or outside the secondary node.

13. A storage control method to be executed by each of a plurality of nodes constituting a storage system, the method comprising:

when there is data to be stored into a segment allocated from a cache, the node performing redundancy-and-non-volatilization determination that is determination for the segment as to whether redundancy which is to transfer redundant data of the data in the segment to another node is required, and whether non-volatilization which is to store the data in the segment into a non-volatile area is required according to a type of the data, and the node controlling, based on the determination, whether to perform the redundancy of the data in the segment and whether to perform the non-volatilization of the data in the segment, wherein the plurality of nodes are a plurality of secondary nodes constituting a secondary storage system, among the plurality of secondary nodes, a first secondary node has a secondary journal volume which is a volume in which a journal is stored, the journal including data to be written into a primary volume in a primary storage system and metadata including a sequence number indicating an order in which the data is to be written, a secondary volume that forms a pair with the primary volume in the primary storage system, a first secondary cache that is a cache in the secondary node, and a first secondary processor that is a processor in the secondary node, the first secondary processor is configured to:

allocate, from the first secondary cache, the segment in which the journal is to be stored, when the data to be stored in the allocated segment is the journal, determine for the segment that the non-volatilization is not required, and when it is determined for the segment that the non-volatilization is not required, not perform the non-volatilization which is to store the journal in the segment into the non-volatile area, and for each of the plurality of secondary nodes, the volume is an area based on one or more non-volatile media inside or outside the secondary node.

* * * * *